United States Patent [19]
Korn et al.

[11] Patent Number: 4,766,581
[45] Date of Patent: Aug. 23, 1988

[54] INFORMATION RETRIEVAL SYSTEM AND METHOD USING INDEPENDENT USER STATIONS

[75] Inventors: Justin Korn, Sapphire Beach, 164, Rte. 6, St. Thomas, V.I. 00802; Stephen F. Schmelzer, Maplewood, N.J.

[73] Assignee: Justin Korn, New York, N.Y.

[21] Appl. No.: 638,401

[22] Filed: Aug. 7, 1984

[51] Int. Cl.⁴ .................. G11B 17/22; G11B 21/08; H04N 5/85
[52] U.S. Cl. ............................... 369/30; 369/34; 369/32; 358/342; 340/706; 235/381; 364/900
[58] Field of Search ............... 369/32, 33, 34, 30, 369/41, 69, 70; 340/706; 364/200, 900; 360/33.1, 79, 15; 235/381; 358/335, 342

[56] References Cited

U.S. PATENT DOCUMENTS

| | | | |
|---|---|---|---|
| 2,167,061 | 7/1939 | Andres | 369/34 |
| 2,275,033 | 3/1942 | Mitchell . | |
| 2,634,984 | 4/1953 | Kasnowich . | |
| 2,666,649 | 1/1954 | Vanderzee . | |
| 3,085,805 | 4/1963 | Bodenröder . | |
| 3,228,698 | 1/1966 | Van Antwerp . | |
| 3,243,777 | 3/1966 | Horstmann | 369/34 |
| 3,383,156 | 5/1968 | Fried . | |
| 3,690,680 | 9/1972 | Lumney . | |
| 3,774,172 | 11/1973 | Silverman . | |
| 3,947,882 | 3/1976 | Lightner | 360/15 |
| 3,964,025 | 6/1976 | Oosterhouse . | |
| 3,990,710 | 11/1976 | Hughes | 369/34 |
| 4,041,249 | 8/1977 | Matz et al. | 369/32 |
| 4,045,776 | 8/1977 | Wheelwright . | |
| 4,081,184 | 3/1978 | Brooks . | |
| 4,108,365 | 8/1978 | Hughes | 369/34 |
| 4,113,366 | 9/1978 | Glover . | |
| 4,123,066 | 10/1978 | Minemura . | |
| 4,127,882 | 11/1978 | Kohl . | |
| 4,141,045 | 2/1979 | Sheehan | 360/15 |
| 4,180,802 | 12/1979 | Oosterhouse . | |
| 4,227,220 | 10/1980 | Brown et al. | 360/15 |
| 4,258,838 | 3/1981 | Rockola . | |
| 4,271,489 | 6/1981 | Siryj . | |
| 4,286,790 | 9/1981 | Siryj . | |
| 4,300,040 | 11/1981 | Gould et al. | 235/381 |

(List continued on next page.)

OTHER PUBLICATIONS

Kenney et al., An Optical Disk Replaces 25 Mag Tapes, IEEE Spectrum, Feb. 1979.

Primary Examiner—Raymond F. Cardillo
Assistant Examiner—Robert A. Weinhardt
Attorney, Agent, or Firm—Ostrolenk, Faber, Gerb & Soffen

[57] ABSTRACT

An information retrieval system is disclosed which provides for user stations and disk readers or tape players. The storage units, such as video disks or cassettes, may be stored oriented vertically in a storage rack. One or more servo-arms on a carriage move along a track to retrieve disks from the storage rack. One of the servo-arms removes a disk from the storage rack and rotates it before inserting it into one of the disk players. The track may extend vertically, so that the players can all be loaded by any of the servo-arms. The storage rack may move past the track to select the disk to be loaded. A control device controls the operation of the servo-arms, the movement of the storage rack, the operation of the readers and the user stations. In addition, the control device selectively connects the readers to the user stations to display selections requested by users. The control device includes an interface for connecting a service console which can change operating parameters stored in the control device or which candown load accounting information gathered by the control means.

Each disk may include menu information which the control device processes and displays on a menu display station. The control device may keep a count of the number of times each selection is requested or paid for, so that the menu may include only the most popular selections. The user may choose a category, artist or subject whose selections will then be included in the menu display. In another embodiment, the user may respond to each selection with a response selecting another selection, and the responses may be stored and evaluated.

28 Claims, 18 Drawing Sheets

U.S. PATENT DOCUMENTS

| | | |
|---|---|---|
| 4,307,418 | 12/1981 | Mindel . |
| 4,340,949 | 7/1982 | Kelleher . |
| 4,341,952 | 7/1982 | John . |
| 4,359,631 | 11/1982 | Lockwood et al. .................. 360/12 |
| 4,387,452 | 6/1983 | Bricot . |
| 4,422,105 | 12/1983 | Rodesch et al. ..................... 358/335 |
| 4,445,147 | 4/1984 | Kessman et al. ....................... 360/12 |
| 4,490,810 | 12/1984 | Hon ....................... 364/410 |
| 4,502,133 | 2/1985 | Siryj et al. .............................. 369/34 |
| 4,504,936 | 3/1985 | Faber et al. ............................ 369/34 |
| 4,527,262 | 7/1985 | Manto ................... 369/34 |
| 4,539,663 | 9/1985 | Ishibashi et al. ....................... 369/34 |
| 4,567,512 | 1/1986 | Abraham ............................ 455/151 |
| 4,573,084 | 2/1986 | Iida ........................ 369/32 |
| 4,597,058 | 6/1986 | Izumi et al. ............................ 364/479 |

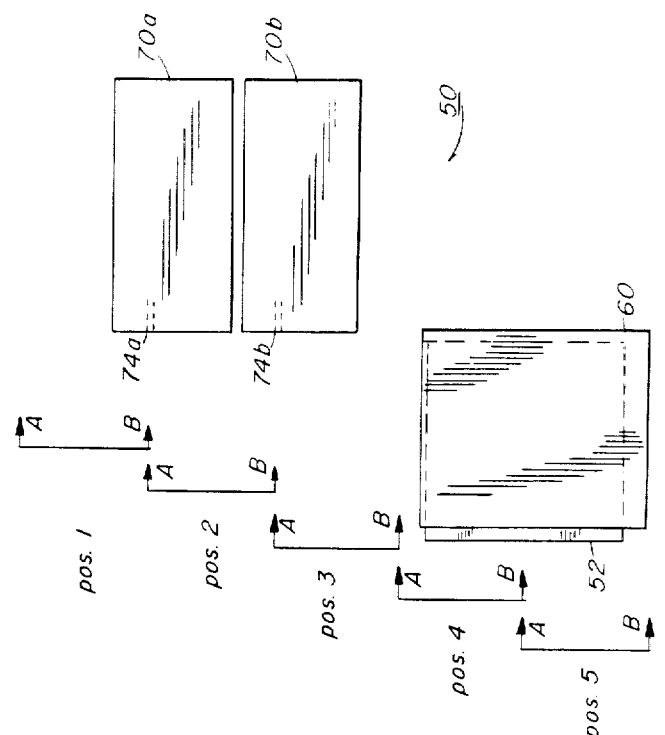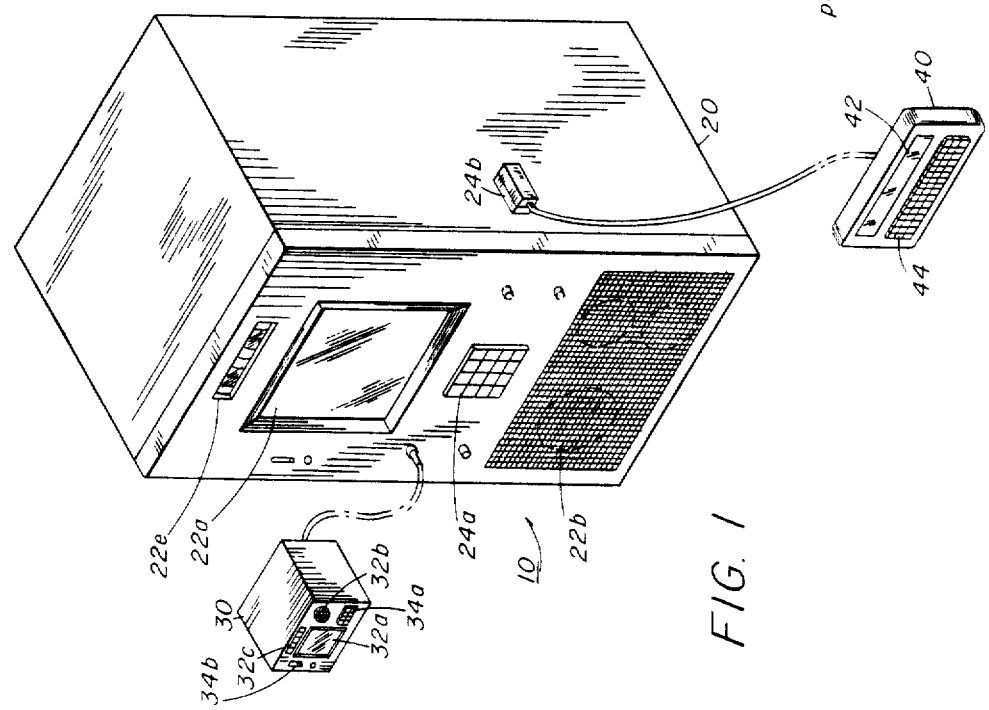

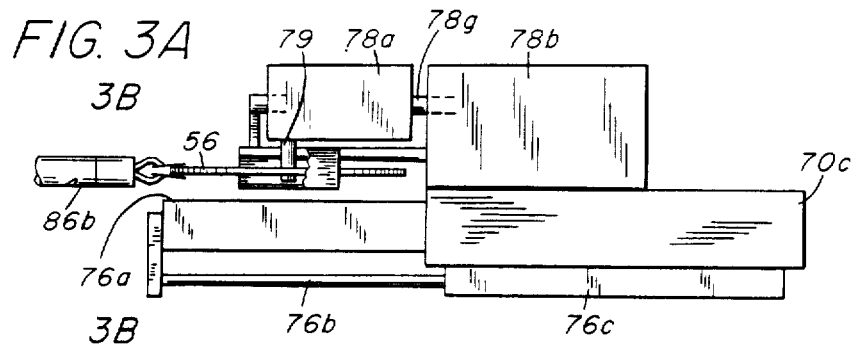

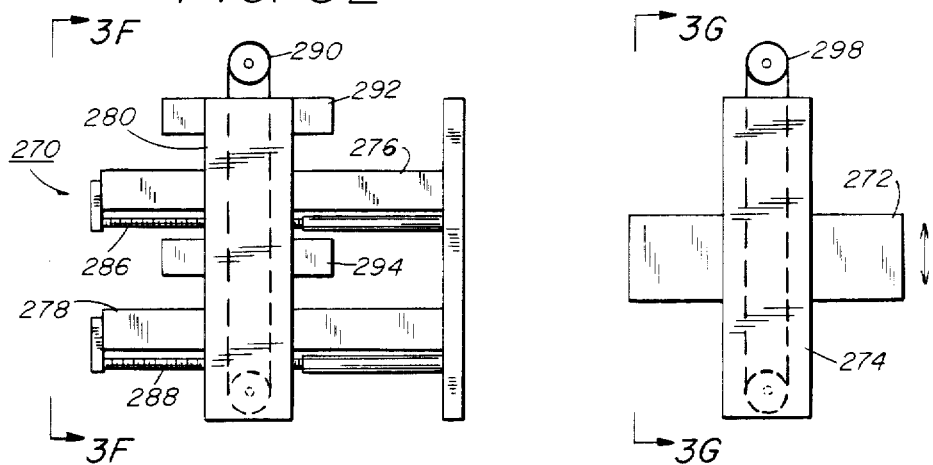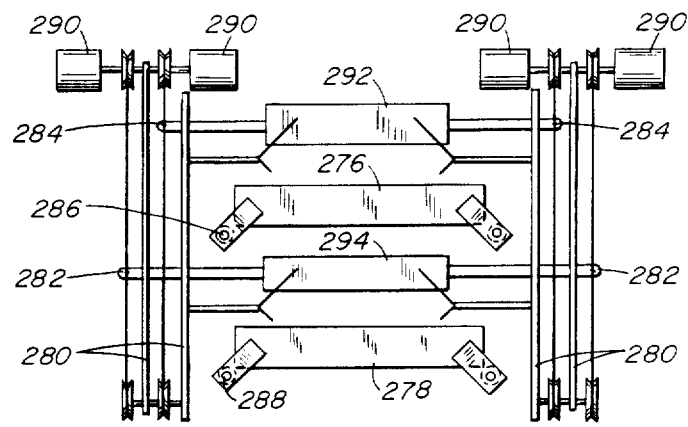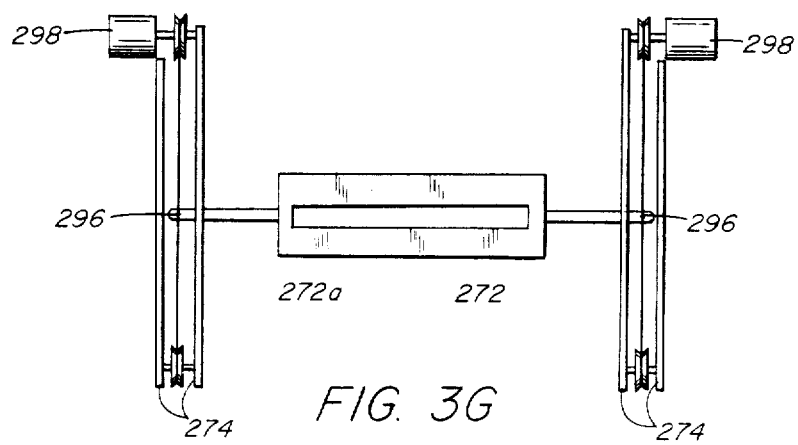

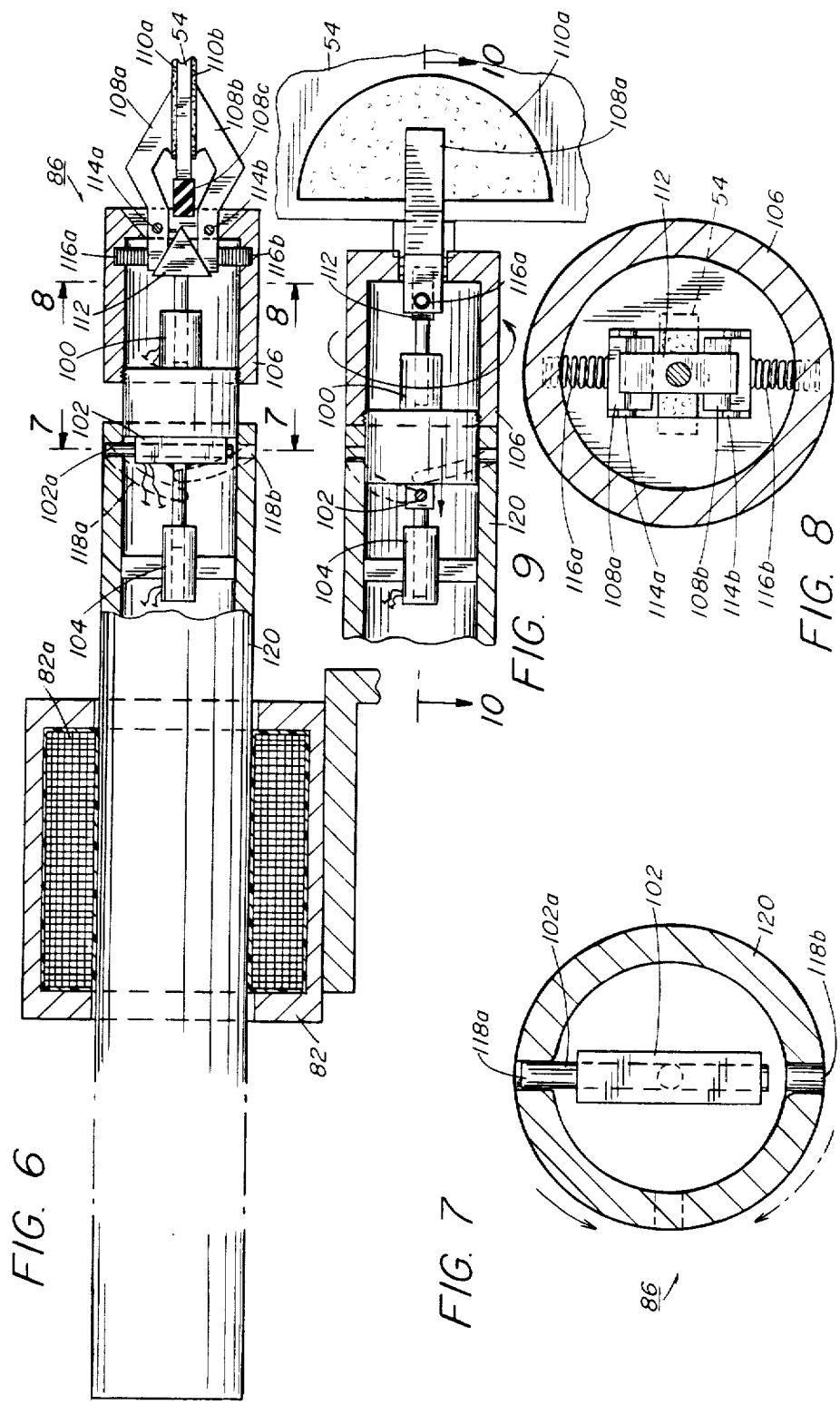

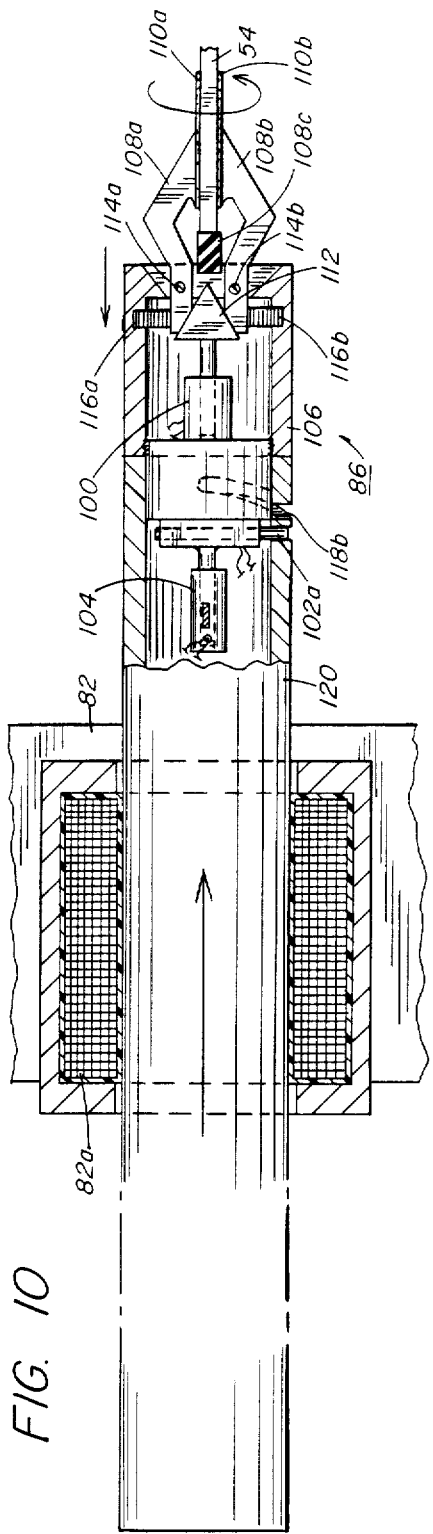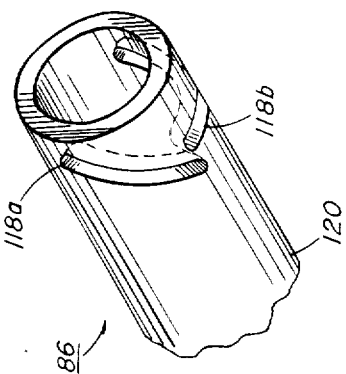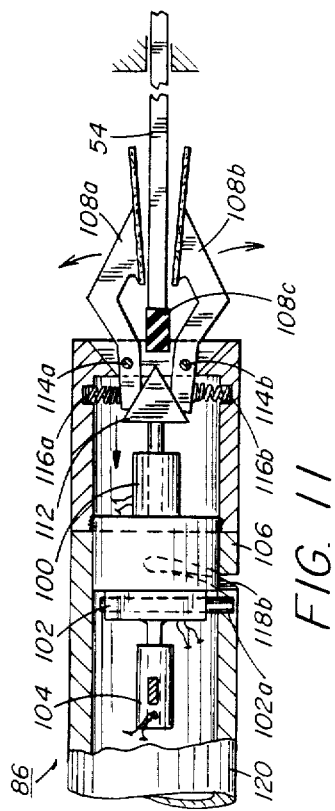

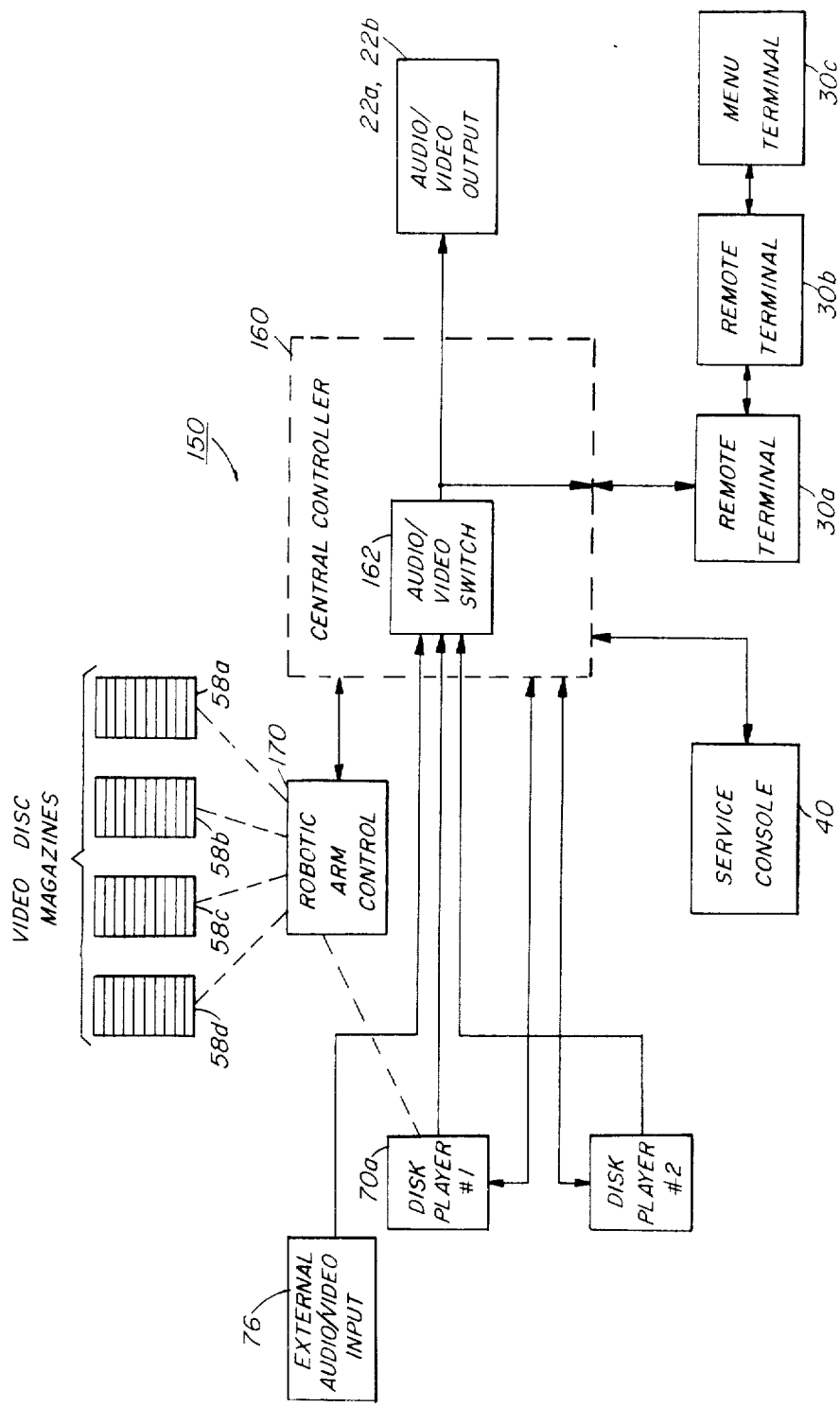

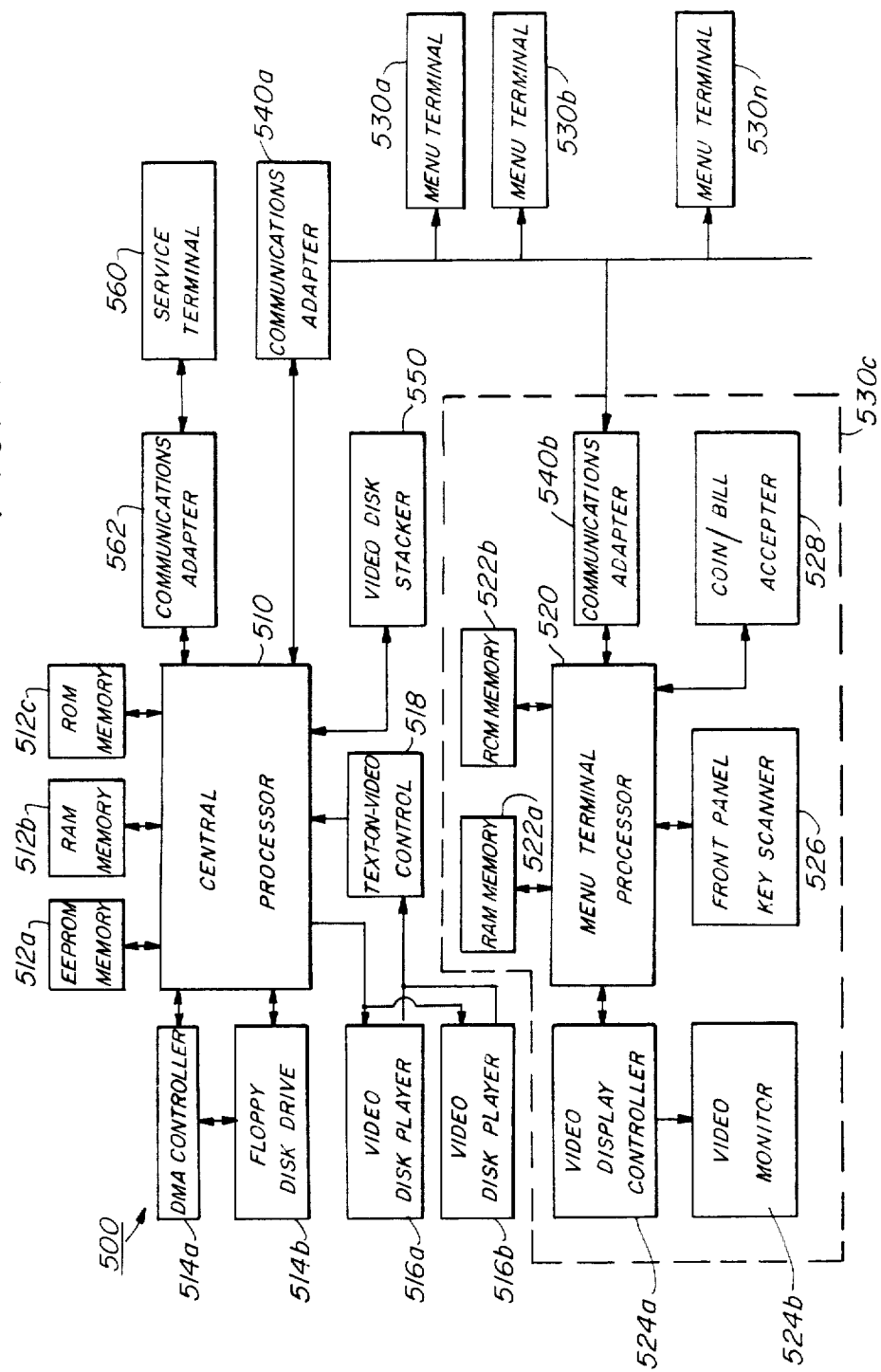

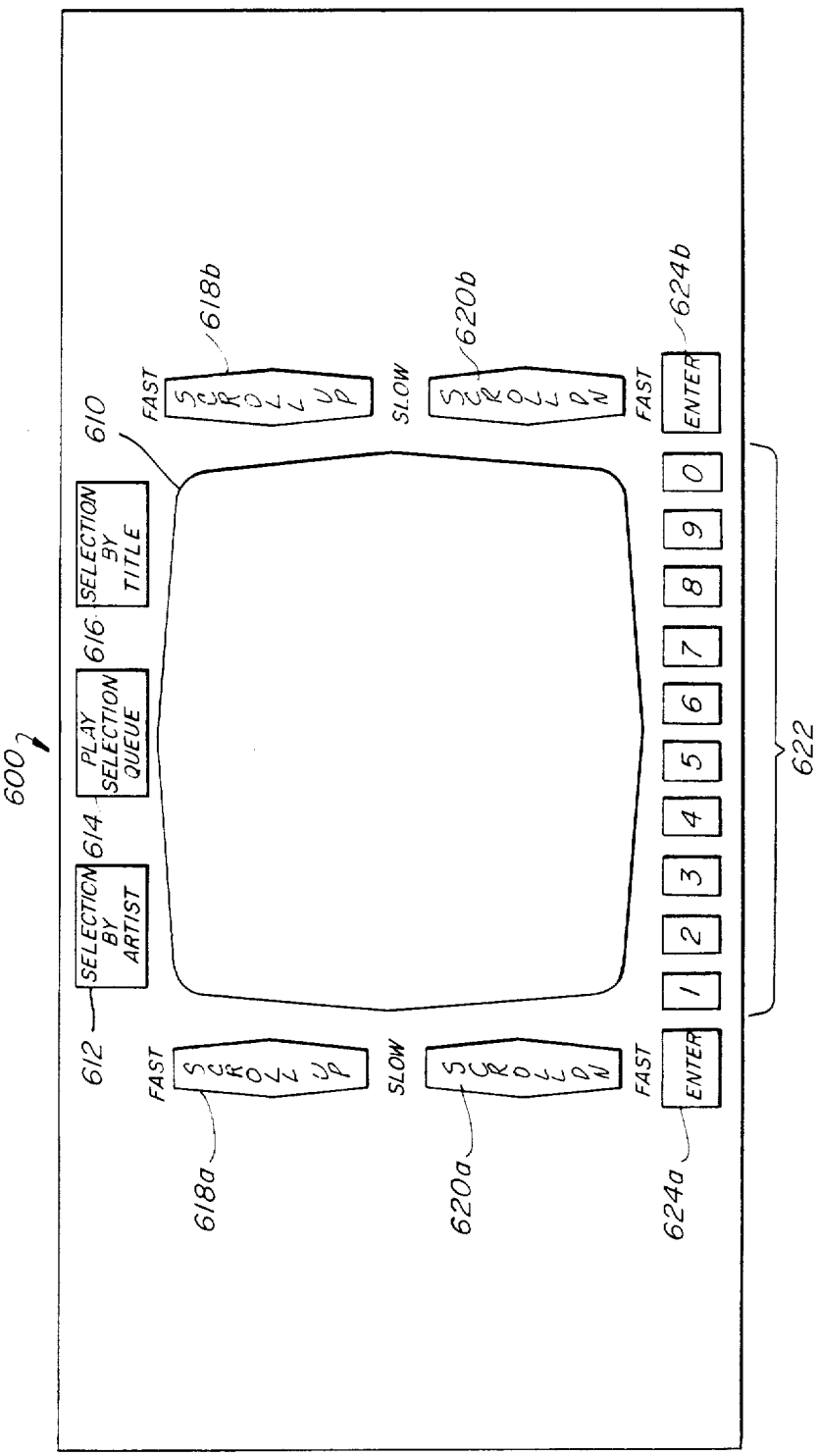

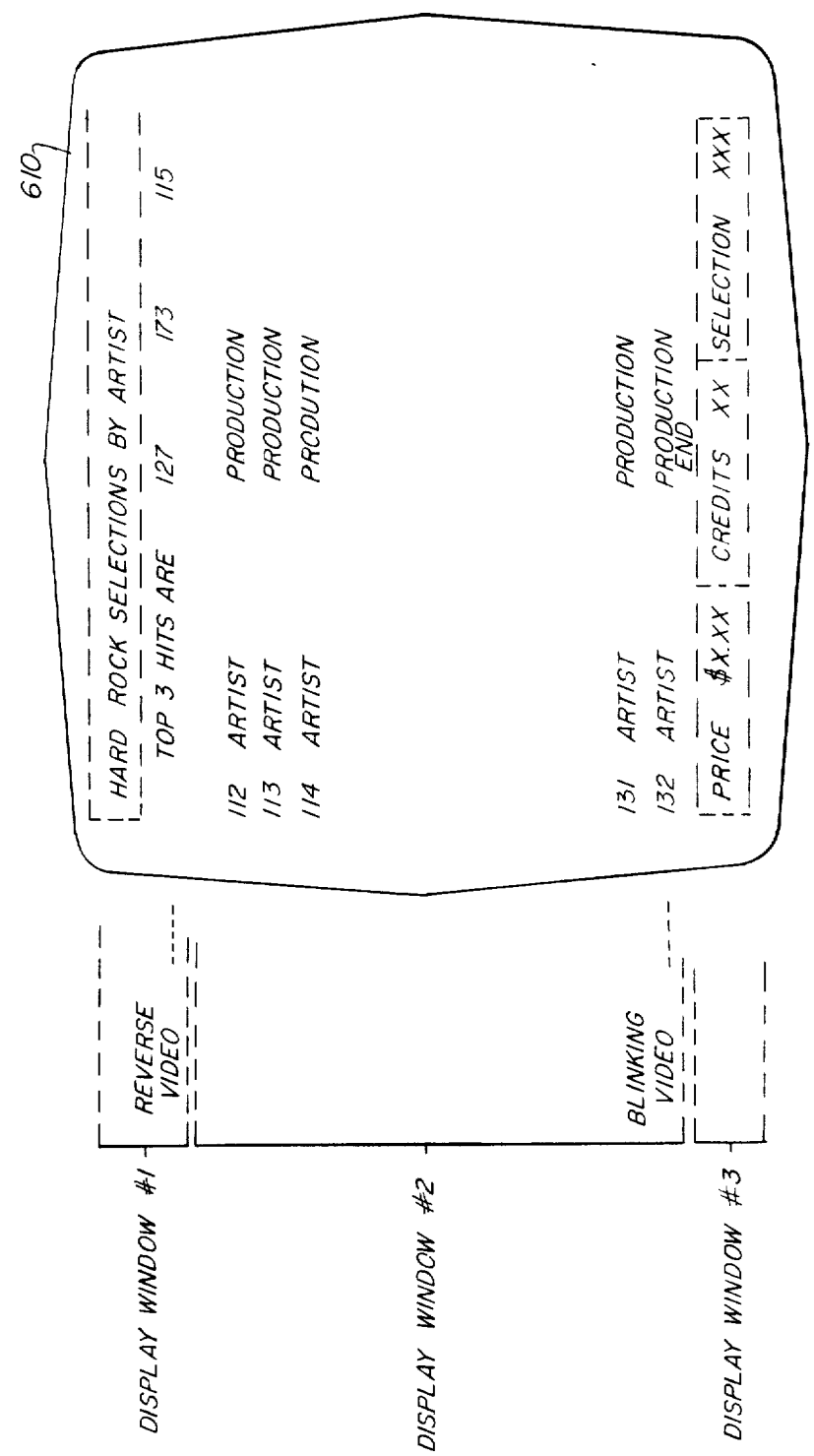

INFORMATION RETRIEVAL SYSTEM AND METHOD USING INDEPENDENT USER STATIONS

BACKGROUND OF THE INVENTION

1. Field of the Invention

The invention relates to apparatus and methods for retrieving and playing information from disks, cassettes, or other information storage units. More specifically, the invention relates to a replay device having independent user locations for accessing the stored information and presenting the information accessed.

2. Description of the Prior Art

The technique of storing information on a disk, cassette or other storage unit has long been known. For example, a musical selection may be recorded in a groove on a vinyl disk and replayed by conventional phonographic techniques. Other examples include cassettes, floppy disks, or diskettes, and hard disks for storing digital data in a magnetic form which may be read with appropriate magnetic sensors. More recently, optical and capacitive (CED) disks have been developed which store information in a form which can be retrieved optically or capacitively. The optical disks are sometimes referred to as laser disks, because they may be read using light emitted by a laser.

Because of the information storage capacity of optical and CED disks, it has become feasible to store both audio and video information on a disk, and such a disk will be referred to herein as a video disk. As a result, a musical selection, for example, may be recorded together with a video script or program on a video disk, and the two may be replayed together for entertainment, commercial or educational purposes. It is also known to provide such information on magnetic tapes as, for example, in a cassette, even though each tape is limited to a certain amount of information, typically 45 musical selections.

One type of prior art disk player for playing a plurality of disks is disclosed in U.S. Pat. No. 4,387,452, issued to Bricot et al. In this device, a number of disks are stacked, and an optical playing device is inserted between the disks for accessing the stored information.

Another prior art disk player is disclosed in U.S. Pat. No. 4,286,790, issued to Siryj et al. In this device, a number of disks are stored in a rack. A changer is movable along the rack to remove disks from the rack and insert them in the same orientation into an optical reader. As a result, the number of disks which can be accessed is increased.

It would be advantageous, however, to provide a player which could play more than one disk or cassette at a time or in sequence, yet could select from a larger number of disks or cassettes in a storage rack. Such a disk player would reduce or eliminate the delay between the playing of disks, by permitting the selection and retrieval of one disk while another is played. Such a disk player would also preferably play selectively from either side of each disk and would randomly access the information within each side of each disk, to increase the amount of information readily accessible. It would further be advantageous to provide such a player in a system with independent user stations for independently selecting the information to be accessed and played and for receiving the information played. Furthermore, it would be advantageous to provide such a system capable of playing video disks. The system could further be an interactive library or information retrieval system in which a user's respoonse determines which information is accessed.

SUMMARY OF THE INVENTION

The present invention achieves these and other advantages by providing an information system and method which may be used for retrieving information from disks or cassettes so as to make the information selectively available.

In one embodiment, the invention includes an operating means, such as a reader, for retrieving information, preferably audio/video information, from a storage unit, such as a disk or cassette. The reader has loading means for inserting and removing the storage unit in a first orientation through a slot or drawer, for example. Near the reader is at least one storage rack for storing a plurality of storage units, preferably disks, in a second orientation, perpendicular to the first orientation. A carrying means is movable for carrying a disk between the storage rack and the reader and for inserting and removing the disk from the reader. For that purpose, the carrying means includes a rotating means for rotating each disk in either a clockwise or counterclockwise direction from the first orientation to the second orientation or vice-versa. In addition, the carrying means includes a holding means, such as a claw or a magnetic clip for gripping an edge, a two-side perimeter gripper for holding a disk at two of its edges or an expanding center hole supporting device, for gripping or holding the disk or a protective cover enclosing the disk. The carrying means preferably includes a carriage movably mounted on a track which extends generally in the same direction as the disks in the storage rack. In addition, the storage rack and carrying means are movable relative to each other in a direction perpendicular to the track, so that the storage rack may be moved to select a disk. The disk may thus be gripped by the holding means, carried to the reader, rotated by 90° in either direction, and inserted in the reader for playing. The process may be reversed when a desired selection has been completed.

The system preferably includes a plurality of readers mounted so that a disk or other storage unit may be inserted in each reader by the carrying means. In addition, a plurality of user stations, such as audio/video viewing stations, are provided for presenting the retrieved information to users, and a control means is provided for controlling the carrying means and storage rack to make selections and for selectively connecting the readers to the user stations to provide a desired selection to a particular user. At least one menu viewing station may also be provided for displaying a list of selections to a user.

In another embodiment, the system includes a reader, a user station, a control means, and also connection means for connecting to a service means for entering inputs to the control means from an operator. The control means may store data such as a currency amount required for a selection or a count of the number of times each selection has been played. The service means which may be connected is operable to change the operating data stored in the control means and is also operable to override the selections requested in the queue by an operator servicing the system. Also, data from the control means may be downloaded to the service means.

In yet another embodiment, the invention includes a plurality of readers and a plurality of user stations, together with a control means for selectively connecting at least one of the readers to at least one of the user stations so that information retrieved by the selected reader from a storage unit may be presented at the user station. The user station may be equipped with inputs for requesting selections, and the control means may store a count of the number of requests for each selection. The system may include a menu display unit for displaying information about the selections available to a user, and the available selections may be formatted according to the number of times each selection has been played. In addition, the menu display unit may include an input so that a user may select a category of selections or a particular artist or subject, and the menu display unit will then display only the selections from that category or by that artist. The information for the menu display may be obtained and updated from menu information stored on the storage units. In addition, the control means may store a queue of selection requests, with each request being eliminated from the queue when it has been played. Similarly, the control means may store information about the length of time to user has used the system or about the activity at a particular user station.

An interactive embodiment of the invention includes at least one reader, at least one user station, control means for presenting information from the reader to a user, an input for the user, and a memory for storing the user inputs. The control means selects the information to be presented in response to the user inputs, and also processes and stores the user inputs in the memory.

One method of displaying stored information according to the invention includes the steps of selecting a user station from a plurality of user stations; selecting a reader from a plurality of readers, the selected reader having access to the desired information; connecting the selected reader to the selected user station; and displaying the desired information at the selected user station. In addition, the method may include receiving selection requests from users, storing the requests in a queue, and loading each selection into a reader when it reaches the head of the queue. The method may also include retrieving menu information from each of the storage units, processing the menu information to provide a formatted menu and displaying the formatted menu on a menu display unit. The menu information may be ordered according to the number of times each selection has been played or other criteria. The method may also include receiving a user input indicating the type of menu information to be displayed.

In accordance with the invention, an audio/video replay or jukebox system and a method are provided for selectively replaying audio/video information for users.

Other objects, features and advantages of the invention will be apparent from the following description, together with the accompanying drawings and the appended claims.

BRIEF DESCRIPTION OF THE DRAWINGS

FIG. 1 is a perspective view showing a central unit, a user unit and a service unit of an information retrieval system according to the present invention.

FIG. 2 is a side view of the profiles of the storage rack and readers of one embodiment of the system of FIG. 1, showing schematically the positions of the carriage of the invention.

FIG. 3A is a side view in partial section of an embodiment for loading a disk into a drawer.

FIG. 3B is a cross-sectional view taken along the line 3B—3B in FIG. 3A showing the center hole supporting device in an upper position.

FIG. 3C is another cross-sectional view taken along the line 3B—3B in FIG. 3A showing the center hole supporting device in a partially lowered position.

FIG. 3D is a side view of an embodiment for loading a disk onto a turntable.

FIG. 3E is a side view of an embodiment for loading a disk into one of two positions for loading one player.

FIG. 3F is a cross-sectional view taken along the line 3F—3F in FIG. 3E showing the two loading positions.

FIG. 3G is another cross-sectional view taken along the line 3G—3G in FIG. 3E showing the player.

FIG. 5A is a top view in partial cross-section of a circular storage rack embodiment of the invention.

FIG. 6 is a partial cross-sectional view of the arm shown in FIG. 3.

FIG. 7 is a cross-sectional view taken along the line 7—7 in FIG. 6.

FIG. 8 is a cross-sectional view taken along the line 8—8 in FIG. 6.

FIG. 9 is a partial cross-sectional view of the end of the arm shown in FIG. 6.

FIG. 10 is a cross-sectional view taken along the line 10—10 in FIG. 9.

FIG. 11 is a partial cross-sectional view taken from the same perspective as FIG. 6.

FIG. 12 is a side view of a part of the arm shown in FIG. 6.

FIG. 13 is a schematic block diagram of one embodiment of the invention which is used as a video jukebox system.

FIG. 19 is a schematic block diagram of an alternative embodiment of the invention in which both a central processor and a menu terminal processor are provided.

FIG. 20 is a schematic front view of the front panel of a display unit for use in the invention.

FIGS. 20A-20C illustrate three menu display formats on the display unit of FIG. 20 according to the invention.

DETAILED DESCRIPTION OF THE PREFERRED EMBODIMENTS

Figure 3:
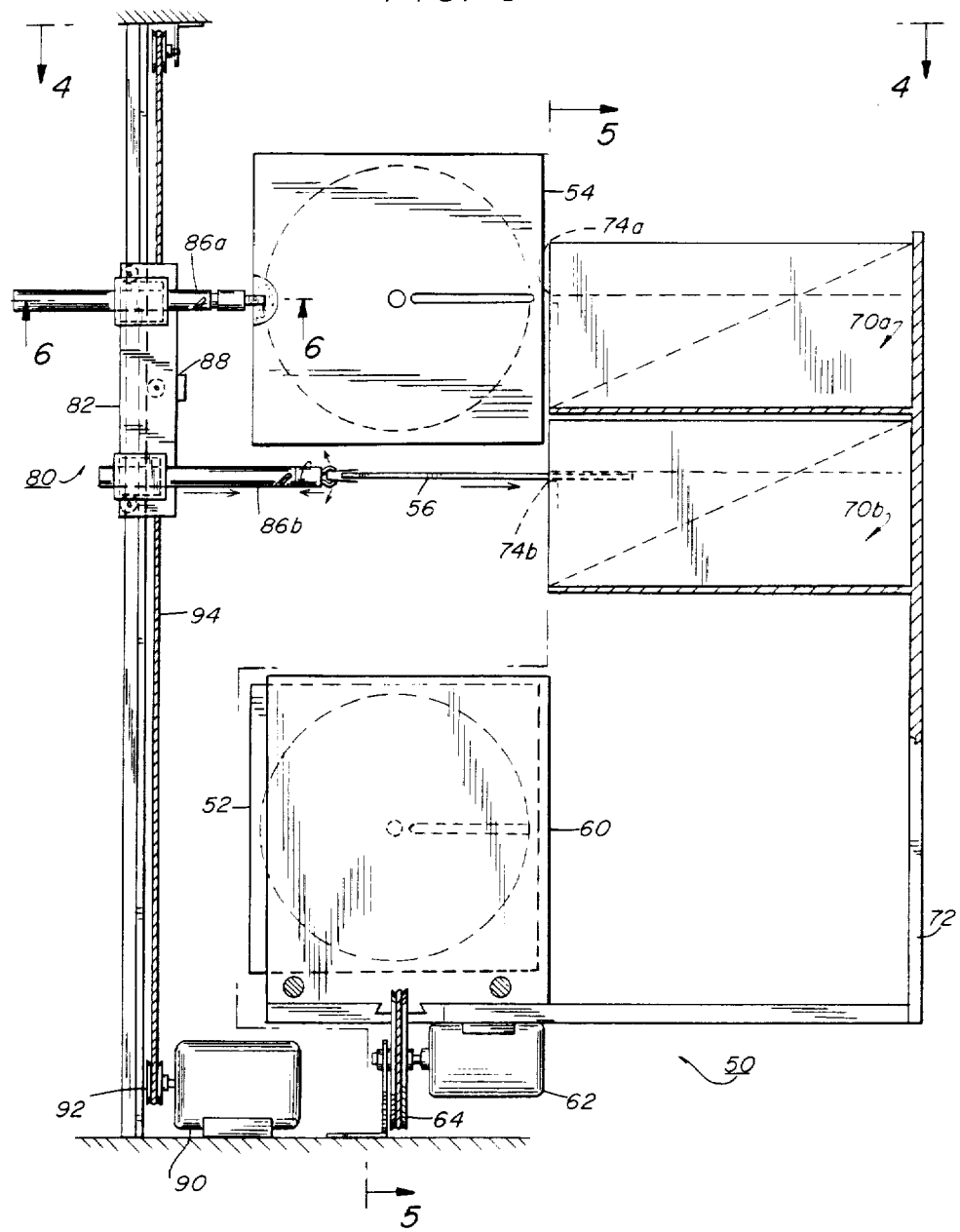
FIG. 3 is a side view showing an example of the structure and operation of the carrying means of the embodiment of FIG. 2.

I. Overview of the Video Jukebox System

FIG. 1 is a perspective view illustrating one embodiment of an information retrieval system of the invention. Retrieval system 10, which may be a video jukebox as shown in FIG. 1, includes a central unit 20 and at least one user unit 30. Central unit 20 includes several devices for providing information to an operator of the system, including a video screen 22a, speakers 22b and digital display 22c. Central unit 20 is also equipped with several means by which an operator may provide information to the system, including keyboard 24a and RS232 port 24b.

User unit 30, which may be a viewing station remote from central unit 20, similarly includes video screen 32a and speaker 32b for providing an audio/video presentation to a user. Viewing station 30 also includes selection keys 34a by which a user may select an audio/video selection after inserting an appropriate amount of money in coin slot 34b. Digital display 32c provides information to assist the user in making a selection.

FIG. 1 also shows one example of a service unit 40 which may be connected with RS232 port 24b or other appropriate connection means by a service person. As shown, service unit 40 includes LCD display 42 and keyboard 44.

The operation of system 10 may be understood by considering how each of the components, the central unit 20, the viewing station 30 and the service unit 40 interact respectively with an operator, a user and a service person. As will be seen, the system interacts with each of these individuals, as appropriate.

The basic function of the retrieval system 10 is to provide audio/video presentations to a user who has inserted an appropriate amount of coins in the coin slot 34b or has provided other appropriate access signals at one of the remote viewing stations 30. Although the present description relates to a coin-operated embodiment, access codes or other access signals could be used. The user may determine what selections are available from a menu viewing station which displays a list of the available selections. After inserting the appropriate amount of coins in coin slot 34b, the user may indicate the desired selection by pressing an appropriate combination of the selection keys 34a. Control circuitry in viewing station 30 will send appropriate signals to central unit 20, indicating the selection which has been made. Circuitry in central unit 20 will then respond to the signals by causing the video disk containing the desired selection to be loaded in a reader, shown in FIG. 2, and connecting that reader to viewing station 30 to permit the audio/video information to be presented by video screen 32a and speaker 32b. Also, in the embodiment of FIG. 1, the selection may be simultaneously displayed on central unit video screen 22a.

The retrieval system of the invention may also be used by a special user or operator, such as the owner or manager of the business establishment in which it is installed. Preferably, a concealed switch or special user key (not shown) is provided on one or more of the viewing stations 30, permitting the operator to interact with system 10. In system 10, shown in FIG. 1, such an operator may interact with the system through central unit 20, which may be appropriately located in a private area of the business establishment. The operator need not insert coins in order to interact with system 10, but may simply make selections using keyboards 34a and 24a. Operation of keyboards 34a and 24a enables the operator to override the selections of users at viewing stations 30 in various ways, discussed in detail below. In addition, the operator may start system 10 and may interact in the same manner as a user, as described above. While interacting with viewing station 30 or control unit 20, an operator will receive signals through digital display 32c or 22c, respectively, which will assist the operator in controlling the system. These displays 32c and 22c may, for example, be LED displays.

Central unit 20 is also equipped with an RS232 port 24b or other appropriate connection means, to which may be attached a service console unit 40, as shown in FIG. 1. This arrangement permits a service person to interact with system 10. Service console 40 includes LCD display 42 and keyboard 44, which enable a service person to interactively change basic operating features of system 10, such as the cost per selection, the selections available from the disks, and other basic features discussed in greater detail below. In addition, a service person using service console 40 is able to monitor basic accounting information about the operation of system 10, which will be necessary to verify the amount of currency collected and to indicate popularity of specific selections.

As can be seen from the above description of the general operation of system 10, an important part of central unit 20 is the equipment used to select the disks to be played and load them into readers. This equipment will now be described in relation to FIGS. 2-12.

II. The Selector Subsystem

The purpose of the selector subsystem is to permit selection of any of a plurality of disks or other storage units from one or more storage racks for playing in one of a plurality of players. FIGS. 2 and 3 illustrate how the selector subsystem 50 of the present invention may accomplish that purpose if the storage units are disks.

FIG. 3 shows a side view of the selector subsystem 50, including partial cross-sectional views of some components. Storage rack 60 contains a plurality of disks 52, stored side by side in the same orientation. Although the invention could be used with any orientations of the stored disks, the orientation of the disks 52 in storage rack 60 will generally be described herein as vertical, so that each disk extends in a single vertical plane. Storage rack 60 may be moved in a horizontal direction perpendicular to these vertical planes by rack drive motor 62 which turns rack drive pulley 64, causing storage rack 60 to be displaced horizontally. As discussed below, more than one storage rack may be provided, and each rack may have a curved elliptical or circular shape.

FIG. 3 also shows two disk players 70a, 70b, which are mounted on player support frame 72. Each of the players 70a, 70b has a slot 74a, 74b or other appropriate receptacle or loading means which may be in a different orientation than the orientation of disks 52 in storage rack 60. In general, slots 74a, 74b are equivalent to the beginning point at which a loading mechanism receives a disk to be loaded. In the embodiment shown in FIG. 3, slots 74a, 74b lie in parallel horizontal planes, so that the disks 52 must be rotated by 90° from their orientation in storage rack 60 in order to be inserted in slots 74a, 74b. Other arrangements of the disk players are possible.

Although a variety of types of disks 52 could be used in the present invention, the presently preferred embodiment makes use of standard laser or optical disk players manufactured by any of several manufacturers, such as Pioneer Models LD-X1000, LD-V10 or LD-V4000, sold by Pioneer Video, Inc. Other alternative embodiments could include the use of a CED disk reader with CED disks, a magnetic disk reader with magnetic disks, an audio compact disk player with audio compact disks, an audio player like a phonograph with audio disks, or an audio cassette player with audio cassettes, for example. The specific features of the laser or optical disk players, however, include the availability of optical disks containing audio/video entertainment selections, together with compatibility in an electronic control environment. Such players may, for example, be equipped with sensors for detecting the presence and position of a disk to assist in loading and unloading.

In order for disk selector system 50 to perform the various operations necessary, carrying mechanism or means 80 is provided, as illustrated in FIG. 3. Carrying means 80 includes a carriage 82 or other appropriate support means movably mounted on a track 84. Track 84 extends generally in the same plane as the disks 52 in the storage rack 60 from adjacent storage rack 60 to a position near upper disk player 70a. Mounted on carriage 82 are two arms 86a, 86b, each of which has various capabilities discussed in greater detail below. Any manageable number of arms could be used, including a single arm or three or more arms. As shown in FIG. 3, arm 86a may carry disk 54 while arm 86b is carrying disk 56. Because of the orientation of track 84, a disk 52 from storage rack 60 may be lifted by one of the arms 86a, 86b and carried directly to a position adjacent one of the slots 74a, 74b. The disk may then be rotated by 90° in either direction for insertion into the slot 74a, 74b. As shown in FIG. 3, disk 54 is in the same orientation as disk 52 in the storage rack 60, so that it could be replaced in the storage rack. Disk 56, on the other hand, has been rotated by arm 86b by 90° for insertion into slot 74b. Although it is presently preferred to rotate the disks by 90°, the disks could be rotated by 180° or by any other appropriate angle to position them for loading or storage. In general, the disks may be stored in any orientation and played in any orientation.

FIG. 3 shows carriage 82 in a position in which the arms 86a, 86b are aligned with the slots 74a, 74b. As shown in FIG. 2, however, carriage 82 may take several other positions for performing specific operations. In position 1, a disk held in arm 86b may be inserted in slot 74a. In position 2, the position illustrated in FIG. 3, a disk in either of arms 86a, 86b may be inserted into or removed from the corresponding one of slots 74a, 74b. In position 3, a disk may be inserted into or removed from slot 74b by arm 86a. In position 4, a disk may be inserted into or removed from storage rack 60 by arm 86b. In position 5, a disk may be inserted into or removed from storage rack 60 by arm 86a.

In order to move carriage 82 between these various positions, carriage drive motor 90 turns carriage drive pulley 92, causing carriage drive cable 94 to change the position of carriage 82 along track 84. The exact alignment of carriage 82, however, is determined by sensing device 88 mounted on carriage 82. Sensing device 88 can operate as a sensor which senses position indicators on track 84 or elsewhere in the disk selector subsystem 50. Alternatively, sensing device 88 may be a signal source which is sensed by a sensor mounted on track 84 or elsewhere in disk selector subsystem 50 for indicating that carriage 82 is correctly positioned in one of its five positions shown in FIG. 2.

Rather than having slots like slots 74a, 74b, some currently available laser or optical disk players, including Pioneer Model LD-V4000, are equipped with a drawer into which the disk must be placed from above. FIGS. 3A–3C show an embodiment of a loading mechanism which could be used for receiving a disk and placing it into such a drawer. Player 70c includes drawer 76a, shown in its fully open position in FIG. 3A. Means are provided for moving drawer 76a between its open and closed positions, such as member 76b which can be extended from housing 76c in response to appropriate control signals. Arm 86b is shown holding disk 56, and is fully extended toward player 70c. Center hole supporting device 78a is positioned above disk 56, and is supported in that position by support 78b. Device 78a is mounted on support 78b by a pin 78g which slides on a track 78h or any other appropriate mechanism for moving between an upper position and a lower position. Device 78a includes means for supporting disk 56 at a center hole, such as an extendable member 79 which is also expandable or spreadable for contacting and firmly holding the center hole of disk 56.

FIGS. 3A and 3B show member 79 extended and expanded in the center hole of disk 56 from two different views. As shown, disk 56 rests against cradle levers 78c and 78d which are pivotally mounted to support 78b at pivot points 78e and 78f. Levers 78c and 78d are also slidably mounted in tracks on device 78a such that they are drawn away from underneath disk 56 as device 78a moves toward its lower position, shown in FIG. 3C. Levers 78c and 78d may be equipped with sensors (not shown) for indicating that disk 56 is resting in position for engagement by member 79. Similarly, member 79 may be equipped with a light source (not shown) and drawer 76a may have an array of sensors (not shown) for assisting the positioning of member 79 over the center hole of disk 56.

When member 79 has engaged the center hole of disk 56, device 78a may be lowered by drive means (not shown) in support 78b, as shown in FIG. 3C. Levers 78c and 78d will pivot around points 78e and 78f, drawing away from under disk 56 so that it may be lowered onto a surface in drawer 78a. A pressure sensor (not shown) in member 79 may be used to sense the drawer 76a when contact is made, so that member 79 will release disk 56 and retract.

FIG. 3D shows another embodiment of a loading mechanism. Arm 86b bolds disk 56 in the fully extended position for loading onto turntable 77a. Disk 56 may then be loaded by either lowering arm 86b or by raising turntable 77a until spindle 77c passes through center hole 77b. An audio disk ordinarily may be placed without being held in place, but in the illustrated embodiment, cap 77d may be lowerred onto spindle 77c to hold disk 56 in place, which will be appropriate if disk 56 is rotated at high speeds, as for random access. Cap 77d and spindle 77c may be equipped with appropriate sensing means for positioning disk 56.

FIGS. 3E–3G show another embodiment of a loading device 270 for loading a single player 272 movably mounted on track 274. Player 272 may thus be loaded by inserting either of drawers 276, 278 into slot 272a, shown in FIG. 3G. Loading devide 270 includes two positioning devices 292, 294 resembling device 78a in FIGS. 3A–3C. Each of devices 292, 294 is mounted on a track 280 by corresponding rollers 282, 284 or other movable members. Drive means 290, such as motors, are provided for moving devices 292, 294 up and down to perform the loading into and out of drawers 276, 278, as shown in FIG. 3F. Similarly, player 272 is mounted on track 274 by rollers 296 and moved into position for loading and unloading one of drawers 276, 278. The loading and unloading operations are performed by moving means 286, 288 which may be similar to the structure of FIG. 3A, but which is mounted to track 280.

The arrangement of carrying means 80 shown in FIGS. 2 and 3 is presently preferred, but this arrangement could be changed substantially without going beyond the scope of the invention. For example, the distance between arms 86a and 86b and the corresponding distance between slots 74a and 74b could be increased so that two disks could be held in the vertical orientation at the same time. The number of arms could be increased, and a single system could include more than one bank and players 70a, 70b, more than one track 84 and carriage 82, more than one storage rack 60, and slots 74a and 74b in other orientations. In addition, additional disk players like players 70a and 70b could be added to permit a larger number of selections to be played simultaneously. A great variety of alternative embodiments is available.

Figure 4:
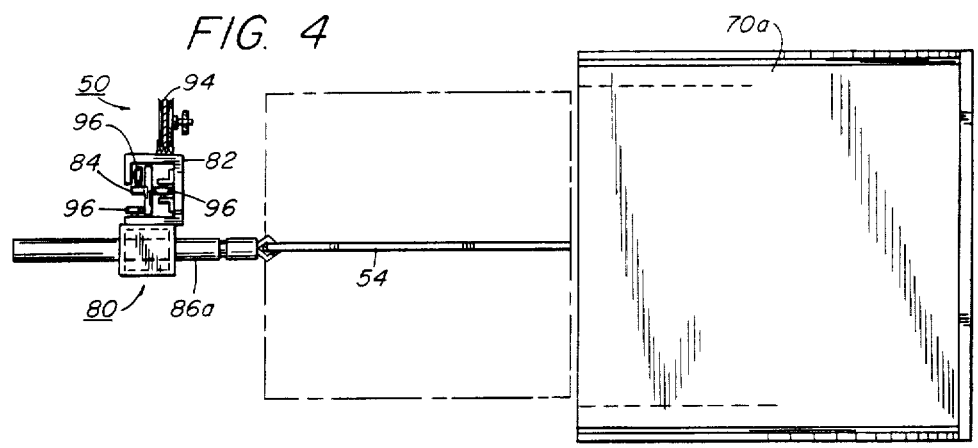
FIG. 4 is a top plan view showing the carrying means and the readers of FIG. 3.
Figure 5:
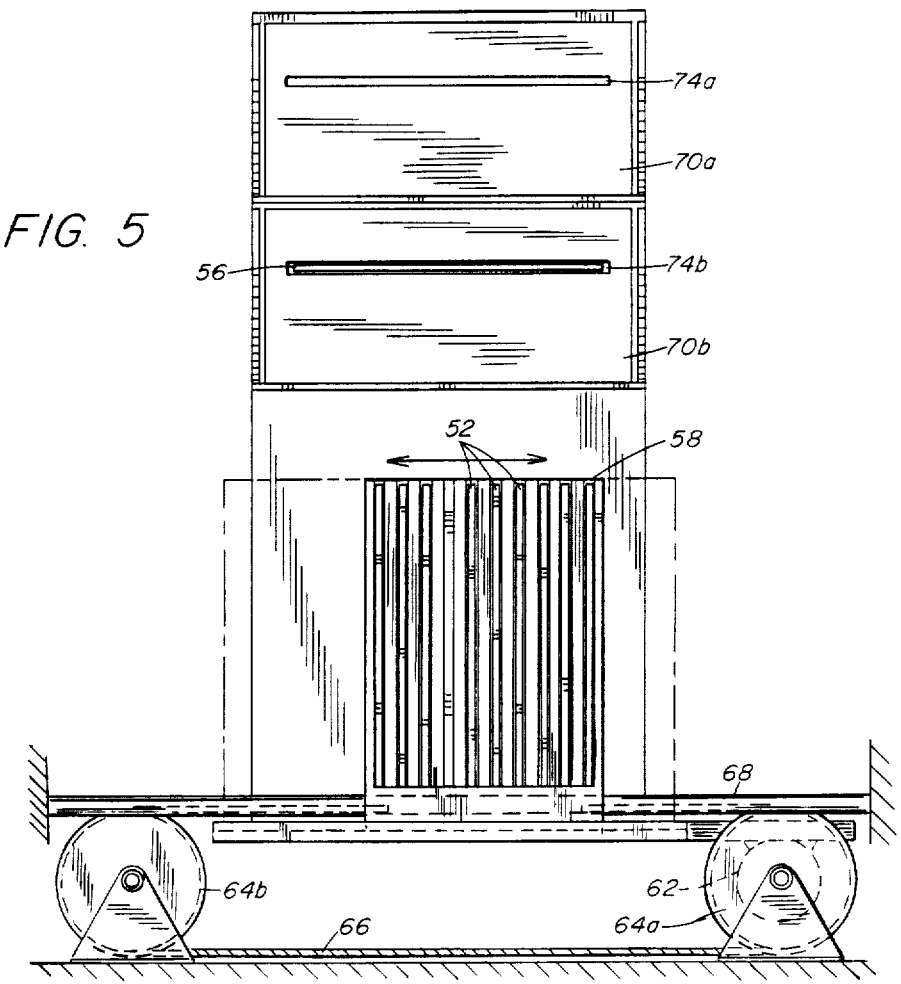
FIG. 5 is a front view showing the storage rack and the readers of FIG. 3.

The details of disk selector subsystem 50 may be better understood from FIGS. 4-12. FIGS. 4 and 5 show details of the disk player arrangement in relation to the carrying means 80 and the storage rack 60. FIG. 5A shows an alternative storage rack arrangement. FIGS. 6-12 show details of the structure of arms 86a and 86b.

FIG. 4 is a top view of the disk selector subsystem 50 of the invention, taken along the line 4—4 in FIG. 3. Arm 86a is holding disk 54 adjacent player 70a, either before or after rotating disk 54 into or from the horizontal position shown as a broken line profile. Arm 86a is mounted on carriage 82 which rides on track 84. As seen in FIG. 4, wheels 96 or similar turning means are provided for maintaining the position of carriage 82 in relation to track 84. Carriage drive cable 94 is attached to carriage 82 for moving it according to the turning motion of carriage drive motor 90. In addition, track 84 may be specially constructed so that control signals controlling the operation of arms 86a and 86b are conducted along conductive strips on track 83 and enter carriage 82 through contacts on wheels 96. The necessary control signals could alternatively be provided through a cable mounted within central unit 20 and connected to carriage 82 in such a manner that it would not become tangled or twisted due to the movement of carriage 82. As noted above, the illustrated embodiment is only one of many possible embodiments, and a variety of means could be used to provide the control signals.

FIG. 5 shows players 70a, 70b in relation to storage rack 60. Disk 56 can be seen being inserted into slot 74b in player 70b; after disk 56 is received into player 70b, however, it may not be visible, due to the operation of player 70b. Magazine 58 containing ten disks 52 is mounted on storage rack 60. Storage rack 60 is preferably capable of containing a plurality of magazines 58, with each magazine being replaceable when it is desired to provide new selections. Each magazine may engage or be equipped with a group of switches or sensors indicating whether a disk is in each slot and to assist in loading the disks. The outputs from these switches may then be provided to the electronic circuitry discussed below. FIG. 5 also shows how storage rack 60 rides on guide rods 68. Motor 62, shown in outline, turns rack drive pulley 64a, causing rack drive cable 66 to move storage rack 60 in an appropriate direction. Rack drive cable 66 also loops around rack drive pulley 64b, so that it can pull the storage rack in either direction in relation to the players 70a and 70b. These movements can be coordinated by separate sensing means or by sensor 88 mounted on carriage 82. By moving storage rack 60 an appropriate distance, any selected one of disks 52 can be aligned to be carried from storage rack 60 to an appropriate one of the players 70a and 70b.

As noted above, disks 52 may be stored in a variety of arrangements, one of which is the rectangular storage rack 60 of FIG. 5. A plurality of such racks could be provided, one above another, for example, to provide a greater amount of storage. Curved storage rack 60a, shown in FIG. 5A, is another alternative for increasing storage. Storage rack 60a may be rotated baout its center by drive means 62a for selecting a disk 52 to be loaded or, alternatively, carrying means 80, shown schematically, may be pivoted about an axis to select a disk. In general, rather than moving the storage rack in any embodiment, carrying means 80 may be moved to select a disk. In addition, means may be provided on the storage rack for positioning a disk to be removed and for guiding a disk back into position in the rack.

FIG. 6 shows in partial cross-section one of the two arms 86a, 86b, whose structure is identical. The view in FIG. 6 is taken generally along the lines 6—6 in FIG. 3. In addition, FIG. 6 shows how each arm 86 is mounted in carriage 82, within coil 82a, such that arm 86 can be moved to the right or left. In effect, arm 86 together with coil 82a, form a solenoid, so that current flowing through coil 82a will control the position of arm 86. For that purpose, arm 86 must contain a suitable permanent magnet (not shown) responsive to coil 82a. A variety of other arrangements, however, are within the scope of the invention, including arrangements in which a miniature motor causes arm 86 to be moved to the right or left by a screwing or gear driven effect or in which a hydraulic or air pressure system moves arm 86 right and left. In general, each reference to a solenoid herein is intended to cover all known equivalent devices for producing the specified motion. As can be appreciated from FIG. 3, however, it may only be necessary that arm 86 assume one of two positions. In one of these positions, arm 86 is aligned to insert a disk into or remove a disk from storage rack 60, and in the other position, arm 86 has inserted a disk into or is preparing to remove a disk from one of the players 70a, 70b.

FIG. 6 also shows a number of smaller solenoids 100, 102, 104 which control other functions of arm 86, and which could also take a variety of other forms. Solenoid 100 functions to control the opening and closing of gripping means such as arms 108a and 108b. Each of the arms 108a, 108b is connected to a corresponding plate 110a, 110b for holding disk 54, as shown. Separating arms 108a and 108b is pad 108c, which may be made of rubber and which also cushions the edge of disk 56. Pad 108c may be equipped with a sensor to detect the presence of disk 56. Solenoid 100 operates by moving wedge 112 between two positions. In the rightward position, as shown in FIG. 6, wedge 112 presses the leftward ends of arms 108a, 108b apart around pivot points 114a and 114b. As a result, plates 110a, 110b are pushed together, and hold disk 54 firmly in place. In the leftward position, shown in FIG. 11, wedge 112 is withdrawn from between the leftward ends of arms 108a, 108b, so that springs 116a, 116b or other biasing means push the leftward ends of arms 108a, 108b together, releasing disk 54. The relationship between wedge 112 and arms 108a, 108b can be appreciated more clearly from FIG. 8, which is a cross-sectional view along line 8—8 in FIG. 6.

The turning of the end part 106 of arm 86 is controlled by solenoids 102 and 104. As shown in FIG. 6, solenoid 102 can move its plunger 102a between two positions, engaging groove 118a in the first position and groove 118b in the second position. This can be seen more cleary from FIG. 7, which shows a cross-section of arm 86 along line 7—7 in FIG. 6. FIG. 12 shows grooves 118a, 118b more clearly from a perspective view. As shown in FIG. 6, solenoid 104 is connected to move solenoid 102 together with end part 106 of arm 86 from right to left. The effect of this will be to turn end part 106 by 90° clockwise or counterclockwise, with the direction of rotation being determined by which of the grooves 118a and 118b is engaged by solenoid 102. As shown in FIG. 7, if solenoid 102 engages groove 118a, end part 106 will rotate counter-clockwise as viewed from the player side. Conversely, when solenoid 102 engages groove 118b, end part 106 will rotate clockwise as viewed from the player side. In addition, as shown in FIG. 9, end part 106 will be moved toward the main part 120 of arm 86 as it rotates.

Several different positions of arm 86 are shown in FIGS. 6, 9, 10 and 11. FIG. 6 illustrates the position in which end part 106 is extended, so that disk 54 is held in a vertical plane. At the same time, however, the main part 120 of arm 86 is in its leftward position, so that disk 54 may be inserted into or removed from storage rack 60. Alternatively, as shown in FIG. 9, disk 54 may be rotated in the counterclockwise direction through the action of solenoids 102 and 104, bringing end part 106 into abutment with main part 120 of arm 86. This rotation of 90° positions disk 54 to be inserted into or removed from one of the slots 74a, 74b or placed into position for loading into drawer 76c. FIG. 10, a partial cross-section taken along the line 10—10 in FIG. 9, shows how coil 82a may then be used to move arm 86 toward the right, inserting disk 54 into slot 74a or 74b or into drawer 76c. Then, as shown in FIG. 11, disk 54 can be released when solenoid 100 moves wedge 112 leftward, permitting springs 116a, 116b to spread arms 108a, 108b.

The means for holding a disk 54 shown in FIGS. 6 and 9-11 may also be equipped with sensors (not shown) for sensing whether disk 54 is held between plates 110a, 110b. In addition, other arrangements for holding disk 54 could be used, such as a fork shaped claw or clamp contacting the edge of the disk at each side. Another arrangement is to use fingers or other contact means for engaging the perimeter of the disk at two points approximately opposite each other. Also a center gripping device could be mounted at the end of each arm 86a, 86b for gripping each disk at its center hole.

FIG. 12 shows how grooves 118a and 118b are formed in the main part 120 of arm 86 in the illustrated embodiment. The precise curvature of grooves 118a and 118b will depend on the power of solenoid 104 and the friction between the plunger of solenoid 102 and the walls of main part 120. FIG. 12, however, illustrates the general arrangement by which end part 106 may be rotated by 90° in either direction.

In the illustrated embodiment, a limited number of control signals are necessary to control the movements of carrying means 80. Two signals are necessary for each of the solenoids, 82a, 100, 102 and 104, for each arm 86a, 86b. Therefore, a total of 16 distinct control signals are necessary for the solenoids. In addition, at least two control signals are necessary for carriage drive motor 90, one to indicate that the carriage should be moved upward, and the other to indicate that it should be moved downward. Similarly, at least two control signals are necessary for rack drive motor 62, to provide leftward and rightward movement of the storage rack 60. Therefore, a total of at least 20 distinct control signals are necessary for controlling the carrying means and the movement of the storage rack. More control signals may be required for other embodiments described above. These signals are provided by electrical circuitry, and we turn now to a detailed description of the electrical circuitry which may be used in one embodiment of the invention.

III. Electronic Circuitry Subsystem

FIGS. 13-16 illustrate an embodiment of the electronic circuitry subsystem 150 which may be used in the retrieval system 10 described above. The electronic subsystem 150, as shown in FIG. 13, controls all of the other functions of the system, including the mechanical operations of the selector subsystem 50 described above.

As shown in FIG. 13, electronic subsystem 150 includes central controller 160 which is interconnected with all of the other electronic components of the system. Within central controller 160 is audio/video switch 162 which provides the audio/video information received from either of the disk players 70a, 70b or from an external audio/video input 76 to one or more of the remote viewing stations 30a, 30b or to an audio/video output such as video screen 22a and speakers 22b.

Central controller 160 also functions to provide control signals to the robotic arm control 170. Although it would be possible for central controller 160 to provide control signals directly to the solenoids 82a, 100, 102, and 104 and to the motors 62 and 90, a separate robotic arm control 170 is provided for this function in the illustrated embodiment. Central controller 160 will, as described below, include a microcomputer, and robotic arm control 170 will also include a microcomputer, connected to central controller 160 through an RS-232 port or other appropriate connection.

In the illustrated embodiment, four video disk magazines 58a-58d are provided on storage rack 60, each magazine containing 10 video disks. Therefore, the signals from central controller 160 can indicate to robotic arm control 170 which of the magazines 58a-58d is desired on two bits; which disk within that magazine is desired on four bits; and which side of that disk is desired on one bit. In addition, central controller 160 must indicate to robotic arm control 170 which of disk players 70a or 70b is involved in the transfer, and whether the disk is to be placed in the player or removed from the player, since the sequence of steps in each case will differ. In addition, if an additional temporary storage location, such as a shelf, were provided, additional signals would be needed to indicated storage on or retrieval from the shelf. This would provide a way of storing the protective cover of a disk 52 while the disk is played in those embodiments employing a protective cover. Alternatively, the cover could be returned to storage rack 60.

In response to a set of signals from central controller 160, robotic arm control 170 will send out signals to rack drive motor 62 to cause it to position storage rack 60 such that the appropriate one of magazines 58a-58d is aligned with the carrying means 80, with the appropriate disk 52 positioned to be picked up by one of the arms 86a or 86b. As was discussed above, the proper alignment of storage rack 60 can be accomplished using sensors, such as sensor 88 mounted on carriage 82. For example, sensor 88 could be aligned with a light source (not shown), such that a signal would be transmitted to robotic arm control 170 whenever one of the disk 52 goes through a certain position. In this manner, robotic arm control 170 could position storage rack 60 by moving it rightward or leftward the necessary number of disks from the previously accessed disk 52.

When storage rack 60 has been correctly aligned, the operation of carrying means 80 can be controlled by robotic arm control 170. Several specific operating scenarios are listed in Table I. Each of these operating scenarios represents a series of steps to be followed by the carrying means 80. For example, operating scenario A begins with the positioning of carriage 82 at position 5, as shown in FIG. 2. At position 5, arm 86a picks up the appropriate sleeve from storage rack 60 in step 1. Then carriage 82 moves to position 3 in which arm 86a is rotated in either the clockwise or counterclockwise direction to align the sleeve with slot 74b. In the third and final step of operating scenario A, arm 86a either inserts the sleeve into slot 74b, or carriage 82 moves to position 2, in which arm 86a inserts the sleeve into slot 74a.

The above operating scenario illustrates some of the features of the illustrated embodiment of the present invention. One feature is that the disks 52 can only be rotated by arm 86a when the carriage 82 is in position 3, while the disk 52 can only be rotated by arm 86b when the carriage 82 is in position 2. As a result, the conflict which might be caused by rotating two disks at once is avoided. This feature could be omitted if the arms 86a and 86b were spaced sufficiently apart.

Another feature illustrated by the above operating scenario is that robotic arm control 170 may perform each function separately by switching a particular signal appropriately. For example, in order to position the carriage at position 5, robotic arm control 170 may provide a signal to carriage drive motor 90 to turn in a particular direction. This signal may be stored in a latch and provided continuously to carriage drive motor 90 until sensor 88 indicates that position 5 has been reached. At that time, carriage drive motor 90 will be switched off by an appropriate signal, and solenoid 100 may be switched by another signal stored in a latch to grip disk 52 in storage rack 60. In a similar manner, each step of each operating scenario may be performed in order to control the carrying means 80. In addition, other feedback signals besides those from sensor 88 may be provided to indicate that a particular step has been completed, so that the next step can begin. For example, additional sensors could be installed to indicate that each of the solenoids has completed its function. Other possible sensors have been mentioned above.

Robotic arm control 170 will, in essence, translate each set of signals from the central controller 160 into a series of steps to accomplish the desired loading or unloading of a disk 52. Ordinarily, as set forth in operating scenarios A-F in Table I, carrying means 80 will move one disk 52 at a time. Operating scenarios G and H, however, provide examples of how carrying means 80 may carry two disks 52 at the same time. Robotic arm control 170 may be programmed to employ operating scenario G when it receives two requests from central controller 160 at about the same time. Robotic arm control 170 may employ operating scenario H when disks without sleeves are used and only the disk in player A is to be replaced, permitting very rapid disk changing. A similar scenario could be used to replace the disk in player B, and these scenarios would need only minor modifications if sleeves were used. These scenarios would be especially useful in a degraded mode in which one player has failed and the other must play all requests. The timing may be controlled so that one arm hovers adjacent the operating player awaiting the completion of a selection so that it may remove a disk, while the other arm hovers with the next disk ready for insertion when the previous disk is removed.

Operating scenario I is specifically appropriate to the embodiment in FIGS. 3E-3G, in which the arms load and unload a single player through two loaders. In this scenario, only arm A is used, which would be useful in an embodiment using only one arm or in a degraded mode in which one arm has failed and the other must handle all disk movements.

The programming of robotic arm control 170 may be done in a number of ways according to known programming methods. The operating scenarios of Table I, however, suggest that a number of standard routines could be stored in memory, to be executed as appropriate by a master program. The function of the master program would be to determine which of the operating scenarios should be executed in order to comply with the signals received from the central controller 160. Then, when the necessary operating scenarios were completed, robotic arm control 170 would return a signal to central controller 160, indicating that a particular side of a particular disk has been inserted in a particular drive. Upon receiving this signal, central controller 160 could proceed with other operations.

TABLE I

| | | Operating Scenarios |
|---|---|---|
| A. | 1. | Position carriage at position 5; arm A to pick up sleeve from rack. |
| | 2. | Position carriage at position 3; arm A to rotate sleeve to horizontal. |
| | 3. | (a) Arm A to insert sleeve into slot B. (b) Position carriage at position 2; arm A to insert sleeve into slot A. |
| B. | 1. | Position carriage at position 2; arm A to remove sleeve from slot A. |
| | 2. | Position carriage at position 3; arm A to rotate sleeve to vertical. |
| | 3. | Position carriage at position 5; insert sleeve into rack. |
| C. | 1. | Position carriage at position 1; arm B to remove sleeve from slot A. |
| | 2. | Position carriage at position 2; arm B to rotate sleeve from vertical. |
| | 3. | Position carriage at position 4; arm B to insert sleeve into rack. |
| D. | 1. | Position carriage at position 4; arm A to pick up sleeve from rack. |
| | 2. | Position carriage at position 2; arm A to rotate sleeve to horizontal. |
| | 3. | (a) Arm B to insert sleeve into slot B. (b) Position carriage at position 1; arm B to insert sleeve into slot A. |
| E. | 1. | Position carriage at position 2; arm B to re- |

TABLE I-continued

Operating Scenarios

|   |   |   |
|---|---|---|
|   |   | move sleeve from slot B. |
|   | 2. | Arm B to rotate sleeve to vertical. |
|   | 3. | Position carriage at position 4; arm B to return sleeve to rack. |
| F. | 1. | Position carriage at position 3; arm A to remove sleeve from slot B. |
|   | 2. | Arm A to rotate sleeve to vertical. |
|   | 3. | Position carriage at position 5; arm A to return sleeve to rack. |
| G. | 1. | Position carriage at position 5; arm A to pick up sleeve from rack. |
|   | 2. | Position carriage at position 3; arm A to rotate sleeve to horizontal. |
|   | 3. | Position carriage at position 4; arm B to pick up sleeve from rack. |
|   | 4. | Position carriage at position 2; arm B to rotate sleeve. |
|   | 5. | (a) Arm A to insert sleeve into slot A. (b) Arm B to insert sleeve into slot B. (c) Position carriage at position 1; arm B to insert sleeve into A (arm A continues to hold sleeve). |
| H. (no sleeve) | 1. | Position carriage at position 4; arm B to pick up next disk from rack. |
|   | 2. | Position carriage at position 2; arm B to rotate next disk to horizontal; arm A to remove previous disk from slot A. |
|   | 3. | Position carriage at position 1; arm B to insert next disk into slot A. |
|   | 4. | Position carriage at position 3; arm A to rotate previous disk to vertical. |
|   | 5. | Position carriage at position 5; Arm A to return previous disk to rack. |
| I. | 1. | Position carriage at position 5; arm A to pick up sleeve with next disk from rack. |
|   | 2. | Position carriage at position 3; arm A to rotate sleeve to horizontal and insert sleeve into slot B. |
|   | 3. | Position carriage at position 2; when previous disk completed, arm A to remove previous disk in sleeve from slot A while player moves to play disk loaded into slot B. |
|   | 4. | Position carriage at position 5; arm A to return sleeve to rack. |

Figure 14:
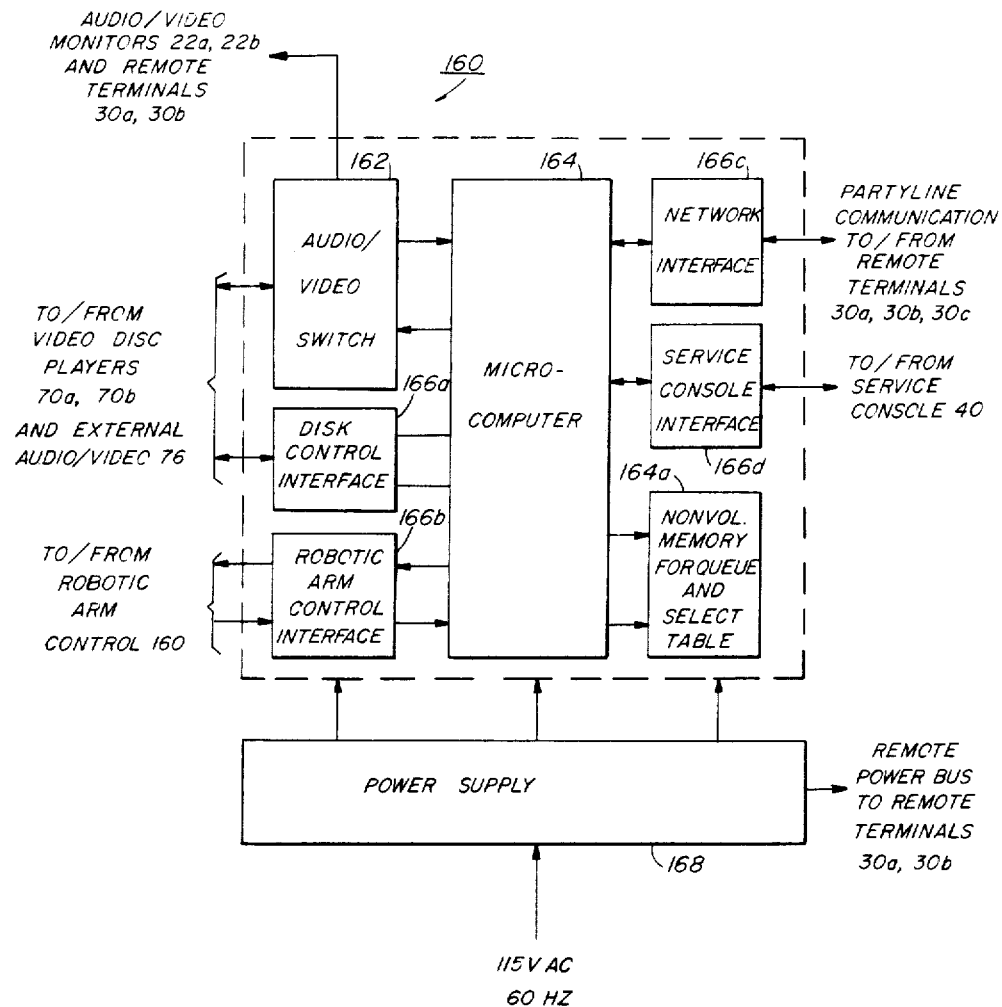
FIG. 14 is a schematic block diagram of a remote terminal for use in the system of FIG. 13.

The other operations to be performed by central controller 160 may be more fully understood from FIG. 14, a block diagram showing its major components in one embodiment. As shown in FIG. 14, central controller 160 is built around microcomputer 164, which may be a standard microcomputer programmed as necessary to control the other components of electronic circuitry subsystem 150. A primary function of microcomputer 164 will be to control the connection between disk players 70a and 70b, and viewing terminals 30a and 30b, through audio/video switch 162, as described above. In addition, microcomputer 164 interfaces with a number of external components or peripherals through interfaces 166a-166d. Disk control interface 166a is connected to disk players 70a and 70b for controlling their operation. Similarly, robotic arm control interface 166b is connected to robotic arm control 160 for providing and receiving the signals described above. Network interface 166c connects with selection viewing stations 30a, 30b and menu viewing station 30c for interacting with a user and for communicating for other purposes with the viewing stations. Servide console interface 166d connects to service console 40 for interacting with service personnel. As set forth above, the robotic arm control interface 166b and the service console interface 166d may be wired for connection through respective RS-232 ports.

Microcomputer 164 must also have certain memory capabilities in order to function as required by the present invention. Some of these memory requirements are met by non-volatile memory 164a, which is shown as a distinct component from microcomputer 164, but which may, in an advanced microcomputer, be provided as a part of the microcomputer itself. The information stored in non-volatile memory 164a will include a selection table capable of listing all of the selections on all of the disks in the storage racks 60, including a unique number identifying each selection independent of where it is located; a playing time indicating the number of seconds the selection will play; an inhibit flag which will preserve the data about the selection even if the selection is removed from the storage rack 60; a stimulation flag permitting the selection to be played to attract users to use the system; a commercial flag for a selection resembling an advertisement, permitting the selection to be played to attract users to use the system; and a number of plays indicating how many times the selection has been requested, paid for or played. In some embodiments of the invention, users may access selections using a code or other access signal rather than payment, in which case non-volatile memory 164a may store the time of access by each user or the number of selections by each user. In addition, non-volatile memory 164a will contain a playing queue listing all selections made by users at the selection viewing stations 30a, 30b, the queue being capable of accommodating a number of selections and each entry in the queue containing the selection number, which is the address at which the information about that selection is stored in the selection table. Non-volatile memory 164a also contains a number of register locations indicating current data such as the selection number of the selection being played in disk player 70a, the selection number of the selection being played in disk player 70b, a pointer or status flag indicating which of the players is currently playing and a stimulation time indicating the length of time in minutes after which the system will perform the stimulation routine, described below.

In normal operation, microcomputer 164 will communicate with all of the peripherals described above in order to manage the flow of audio/video information from disk players 70a, 70b or external audio/video input 76 through the audio/video switch 162 to the appropriate selection viewing stations 30a, 30b. In addition, microcomputer 164 will control the movements of the carrying means 80 and motors 62 and 92 through robotic arm control interface 166b connected to robotic arm control 160. Microcomputer 164 will similarly control the operation of video disk players 70a, 70b through disk control interface 166a. Microcomputer 164 will also communicate with selection viewing stations 30a, 30b and menu viewing station 30c through network interface 166c which operates a round-robin poll type network. None of the viewing stations connected to this network will respond to microcomputer 164 unless specifically addressed, and each viewing station shall have a unique address which may be used by microcomputer 164 to obtain information from that viewing station. If any of the selection viewing stations 30a, 30b provides a selection request, microcomputer 164 will first verify that it is a valid selction before entering it into the playing queue. If not, it will provide a signal to be displayed on digital display 32c of the viewing station 30a or 30b, indicating an error, and permitting the user to make an alternate selection. But if the selection is valid, microcomputer 164 will enter it into the playing queue and will increment the stored count, indicating how many times that selection has been requested or paid for. The microcomputer 164 will also interface with service console 40 through service console interface 166d.

Figure 20B:
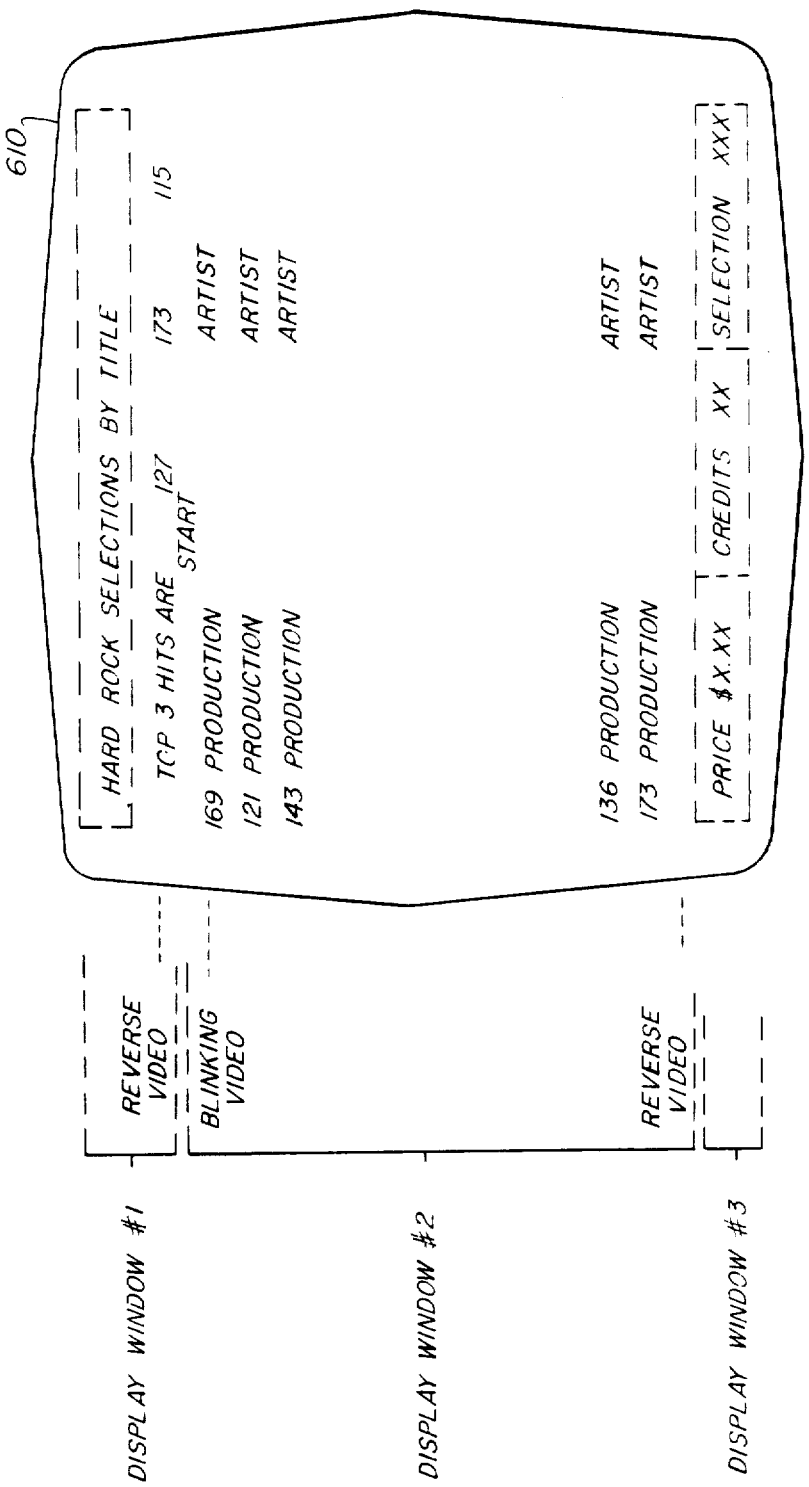

The microcomputer 164 is preferably operable to perform a menu reading routine for obtaining menu information to be subsequently processed and provided to the menu viewing station 30c, an example of which is shown in FIG. 20, discussed below. Before the routine may begin, as shown in FIG. 21, the disks must be loaded into the system and the system must be initialized, as shown in box 710. This routine involves reading menu data from each disk in the storage rack and storing the menu data in the non-volatile memory 164a as in box 720. The specific menu data stored on an initial track on each disk may include, for each selection on the disk, the unique accounting number of that selection; the name of the selection; the name of the artists who performed the selection; the year the selection was released or first appeared on the charts; the playing time of the selection; a category number indicating whether the selection is, for example, jazz, rock or other type of music; and the production company name or an identifying number. When this data has been loaded in the non-volatile memory 164a, the microcomputer 164 may then perform appropriate processing to integrate the menu information into categories, with each item in each category being in numerical or alphabetical order, as appropriate, as in box 730. Each item will be associated in memory with the address or disk location of the corresponding selection.

Boxes 740, 750, 760 illustrate a display loop which can begin once the menu information is processed into categories. The broadest categories available to the user are first displayed at box 740. These may be the categories of music available on the system, such as hard rock, jazz, etc. The user may request one of these categories, for example by pressing appropriate ones of push buttons 622 on the display unit 600 of FIG. 20. The microcomputer 164 will receive this request at box 750, when the user presses one of enter buttons 624a, 624b. The request is tested to decide if it is for a selection or merely for other menu information, at box 760. If for menu information, the requested information, such as a list of sub-categories within a larger category or a list of selections in a category by artist or title, as in FIG. 20A or 20B, is accessed from memory and displayed at box 770.

When the user requests a selection, that selection is accessed and retrieved from its storage unit and displayed at box 780. This completes the routine, but the system may return to a display of the basic categories in box 740 after box 780 is completed. If a single display is used for both menu and selection information, the system must await the completion of the requested selection before returning to another display of categories in box 740.

The method of FIG. 21 may also be performed on the embodiment of the invention shown in FIG. 19, using a separate menu terminal processor. FIG. 19 is discussed in detail below.

The microcomputer 164 also performs a playing queue maintenance routine including several important functions. The playing queue maintenance routine responds to a selection request from a user by first comparing the selection requested with the selections in the selection table to verify that a valid selection has been made. If valid, a selection request data unit indicating the selection is then placed at the end of the playing queue. Then, whenever a selection has been completed on one of the disk players 70a, 70b, playing of the next selection on the other disk player may proceed, and a new selection may be set up on the now idle disk player. When a selection is completed, however, the playing queue maintenance routine first removes the unit indicating the completed selection from the playing queue and checks whether another selection on the same side of the same disk, but with a greater selection number, is on the playing queue. If so, that selection will be played immediately. If not, the selection set up on the other player will be played, the disk with the completed selection will be removed from the player, and the next selection at the top of the playing queue will be taken from the storage rack 60 and inserted in the empty disk player 70a or 70b. In an alternative embodiment, more than one selection could be played at a time, with each selection provided to a specific user. This would result in greater delay between selections, however.

Microcomputer 164 could alternately perform a modified playing queue maintenance routine. In this embodiment, each disk could contain a single selection, such as a movie. Of the disks available, for example 100 disks, 20 could be provided storing each of five movies available on the system. If each of the selection viewing stations 30a, 30b is located in a room of a hotel, for example, the occupant of each room may request any of those five movies at any time. Upon receiving such a request, microcomputer 164 will access a movie selection queue in its memory containing data units designating those disks storing the requested movie, arranged in some predetermined order. The disk designated by the top data unit of the movie selection queue will then be accessed. Microcomputer 164 will also access a player queue in its memory for the data unit designating the next player to be used, which, in the described system, could be one of 20 players, for example. The accessed disk will then be loaded in the next player, and the replay of the movie will be connected to the selection viewing station 30a, 30b in the room from which the request was made. In this way, each movie selection queue and the player queue will be separately maintained.

As mentioned above, the microcomputer 164 may also perform a stimulation routine, whenever it has not received a selection from one of the selection viewing stations 30a, 30b for a long period of time. As indicated above, flags stored in the non-volatile memory 164a indicate which of the selections should be played as a result of the stimulation routine, so that the stimulation routine involves scanning the selection table to select appropriate selections for stimulation purposes. The stimulation routine is only invoked if the time since the previous selection from a selection viewing station 30a, 30b exceeds the stimulation time stored in non-volatile memory 164a. If the stimulation time is set to 0, the stimulation routine will never be invoked. The two types of stimulation are selection stimulation, in which any of the selections with a stimulation flag may be played, and commercial stimulation, in which special productions which are not selections available to the user may be played.

Figure 15:
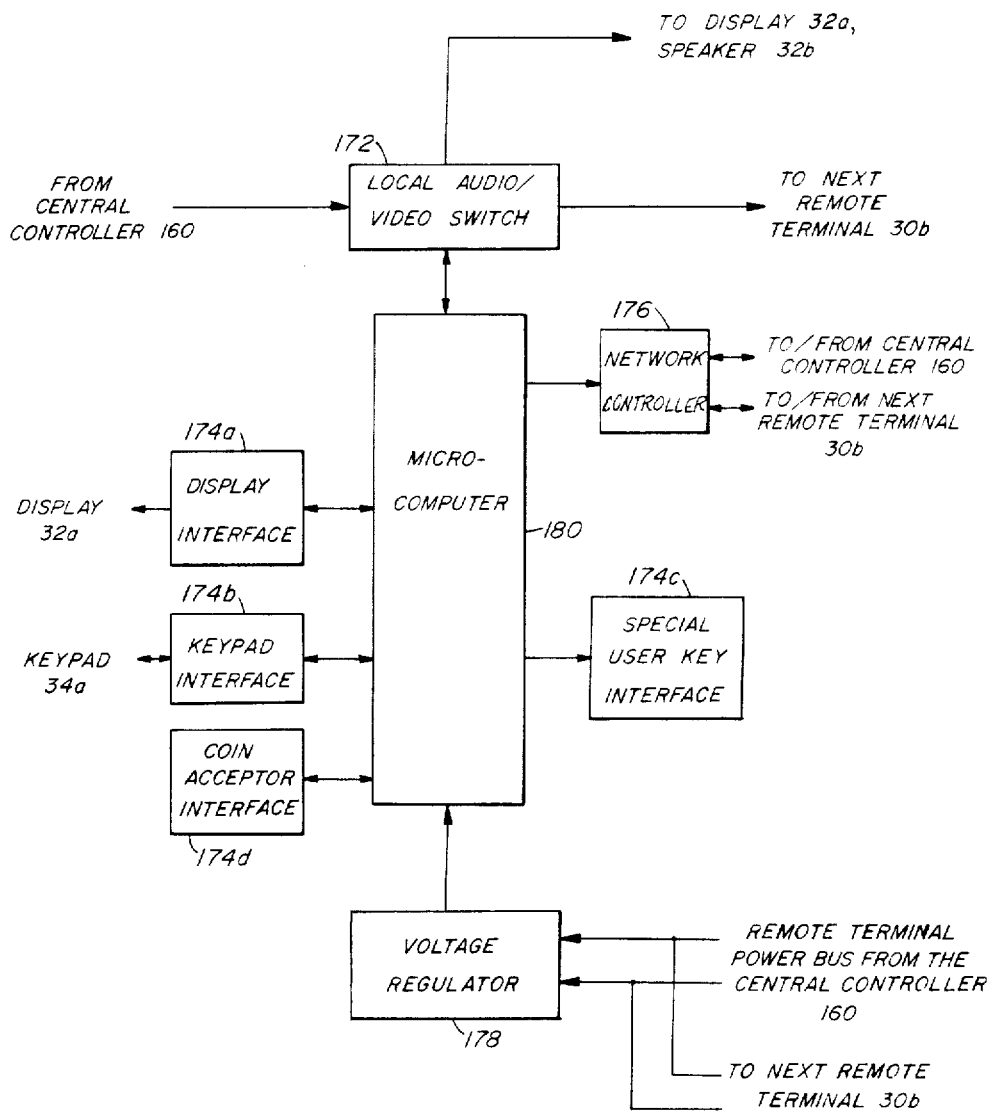
FIG. 15 is a schematic block diagram of a menu terminal for use in the system of FIG. 13.

FIG. 15 shows a schematic block diagram of that part of electronic circuitry subsystem 150 in selection viewing station 30a, which is the same as in station 30b. Microcomputer 180 performs the basic operating program for this circuitry, including activating the local audio/video switch 172 when the local video screen 32a and speaker 34b should present the audio/video information from the central audio/video switch 162. The arrangement shown in FIG. 15 permits only a single audio/video selection to be presented at a time, because all of the viewing stations are connected in a loop arrangement. If, on the other hand, a hub and spoke connection were made with central audio/video switch 162, more than one of the selection viewing stations 30a, 30b could present audio/video information at the same time from two different selections. Microcomputer 180 is also connected to various peripheral devices through interfaces, including display interface 174a connecting to LED display 32c on the viewing station to indicate, for example, a selection being entered by a user; keypad interface 174b connected to selection keys 34a for receiving selections made by a user; coin acceptor interface 174d interfacing with any standard coin or bill acceptor, such as the Coinco Models 790 or 5,000 or the Rowe International Models 55 or 604; and the special user key interface 174c, permitting an authorized operator of the system to override ordinary user selections. Microcomputer 180 is also connected to network controller 176 for communicating with the central controller 160 through network interface 166c, described above. Microcomputer 180 relies for power on voltage regulator 178 which receives power from power supply 168 shown in FIG. 14.

Microcomputer 180 will normally perform routines including accepting money through the coin acceptor interface 174d and computing the corresponding number of selections which may be made; entering information through the keypad interface 174b about selections made by a user; providing error or status indications through the display interface 174a indicating that an invalid selection has been made, that another selection should be made, the amount of selection credits remaining, or the selection number of a selection being made; displaying information through display interface 174a indicating the top three selections in the system or the selection number currently being played; and displaying the size of the playing queue through display interface 174a in response to keyboard command from keypad interface 174b. In general, as noted above, these items will be displayed on LED display 32c.

When the special user key interface 174c indicates that a special user or operator has control of the selection viewing station 30, microcomputer 180 will also perform routines which permit the special user to make a free selection; to stop the current selection being played and go to the next selection in the playing queue; to suspend the current selection, placing it back in the queue and substitute another selection or an entire disk side; to delete all entries in the playing queue made before the last system power turn-off or on; to delete all entries in the playing queue; to freeze the playing queue, stop selection by users and select input from external video input 76; to enable or disable the free play option; or to restart the entire system. As discussed above, these functions may also be performed at central unit 20 by an authorized operator, so that central unit 20 may contain a separate microcomputer for performing these functions in addition to microcomputer 164 for the central controller 160.

Microcomputer 180 may also perform a number of routines relating to communications with central controller 160. Communications with the central controller 160 include the following functions: When system power goes up in response to power supply 168, or at other times upon command, microcomputer 180 may perform a routine configuring itself with regard to the network controller 176, to obtain an address which central controller 160 will subsequently use to address microcomputer 180. When requested by central controller 160, microcomputer 180 will perform a routine providing the selection number which has just been entered, if any. In response to a signal from the central controller 160, microcomputer 180 can also perform routines which receive information from the central controller to be stored in microcomputer 180. These routines will store, for example, the number of selections in the playing queue, the number of coin pulses required for a selection, and the selection number of the selection currently being played.

Figure 16:
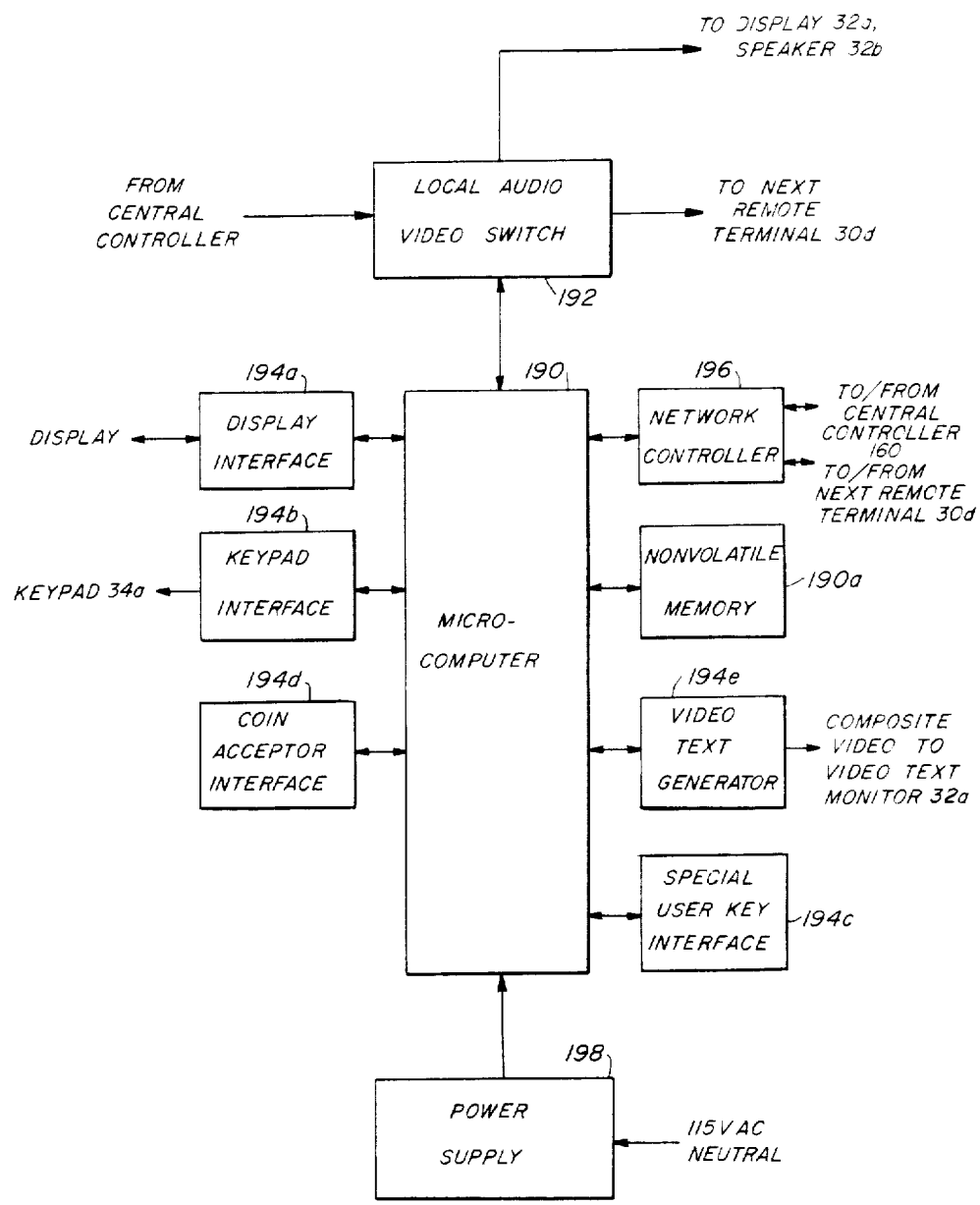
FIG. 16 is a schematic block diagram of a central controller for use in the system of FIG. 13.

FIG. 16 shows that part of the electronic circuitry subsystem 150 found in the ménu viewing station 30c. Microcomputer 190 controls the functions of the menu viewing station 30c, and may also be used for viewing selections when microcomputer 190 activates local audio/video switch 192. As can be seen from FIG. 16, the menu viewing station has all of the capabilities of selection viewing stations 30a, 30b, as shown in FIG. 15, but also includes certain additional features. Specifically, in addition to display interface 194a, keypad interface 194b, special user key interface 194c, and coin acceptor interface 194d, microcomputer 190 is connected to video text generator 194e for generating a text display showing, for example, the top 10 most popular selections for each artist available on the system or the top 10 most popular selections in a particular category of music on the system. In addition, microcomputer 190 is connected to non-volatile memory 190a which stores the selections which may be displayed to a user. Microcomputer 190 is also connected to network controller 196 and power supply 198. Unlike microcomputer 180 in the selection viewing station, however, microcomputer 190 is illustrated as having a separate isolated power supply 198, rather than receiving its power from power supply 168.

Microcomputer 190 may use non-volatile memory 190a to store several types of information provided by microcomputer 164. This information may include a category table listing a number of categories of selections; a production company table listing a number of names of production companies for the selections available; and a menu table listing a number of selections, preferably the same number listed in the selection table in non-volatile memory 164a. The information in the menu table will include the name of each selection, the number of the category in which it falls, the number of the company which produced it, the name of the artist and the number of times the selection has been played.

Microcomputer 190 will normally perform routines identical to those of the selection viewing stations described in relation to FIG. 15. In addition, in response to selections on selection keys 34a, microcomputer 190 will perform routines permitting the user to select a category of menu data for display. In response to a selection by the user, microcomputer 190 may format a menu and cause the formatted menu to be displayed through video text generator 194e. In other words, microcomputer 190 may perform some of the steps discussed above in relation to FIG. 21 under control of microcomputer 164.

FIG. 19 shows the control circuitry 500 of another embodiment in which each terminal may function both as a menu terminal and for selection display. Central processor 510 forms the nucleus of the circuitry 500, which also includes at least one menu terminal processor 520 in one of menu terminals 530a-530n. In this embodiment, central processor 510 may store the current play selection queue in EEPROM memory 512a, a non-volatile memory; stores the menu data base and maintenance and selection information in non-volatile form on microfloppy disk drive 514b accessible through DMA controller 514a; stores the menu data base for transfer in RAM 512b; and has its utility programs stored in ROM 512c. Central processor 510 also sends signals to video disk players 516a, 516b to control the access of information from video disks. The retrieved information may have text overlayed onto video by text-on-video control 518 under control of central processor 510. Central processor 510 may access both CAV and CLV video disks, and, in general, the invention is intended to permit accessing of information by any method or protocol from disks, including random access, associative access, sequential access or any programmed accessing procedure. Video disk stacker 550 selects the disk to be accessed under control of central processor 510, and may take any form, including the specific embodiment described above.

Central processor 510 communicates with a number of menu terminals 530a-530n through communications adapter 540a. The circuitry of menu terminal 530c is shown in detail, centered around menu terminal processor 520 which communicates through communications adapter 540b. Adapters 540a, 540b may use the RS485 standard protocol. Processor 520 stores menu data in RAM 522a and has its utility programs stored in ROM 522b. Processor 520 transfers data for display to video display controller 524a for display on monitor 524b. Processor 520 also receives inputs through front panel key scanner 526 and coin and bill accepter 528.

Control processor 510 may also communicate with a service terminal 560 through communications adapter 562, as discussed above in relation to service unit 40.

It would be possible to display the selections available in the form of a printed menu mounted, for example, adjacent LED indicators (not shown) to indicate the most popular selections, such as the top 10. It is also possible, however, to take advantage of the display capabilities to display menu data electronically, and FIG. 20 shows the front panel 600 of a display facilitating the display of menu data. Around screen 610 are a number of buttons for enabling the user to interact with the display. Push buttons 612, 614, 616 permit the user to select a specific type of menu data for display. Scroll up buttons 618a, 618b and scroll down buttons 620a, 620b are pivotable to provide scrolling at more than one rate. Numerical keys 622 permit entry of selection numbers or other data, and pushing one of the enter keys 624a, 624b causes the data entered by pressing one or more of keys 622 to be sent to the appropriate processor. Additional keys (not shown) could be provided for entering specific categories of selections. In addition, an all-category key can be provided so that the user can select a category which includes all the other categories. In this way, the most popular selections in the entire system could be displayed. In addition, all the artists in the system could be displayed alphabetically with their selections in separate categories or in the single category including all categories. Alternatively, the songs in each category could be listed by artist or by any other relevent criterion such as year of release, alphabetically by title or popularity.

Figure 20C:
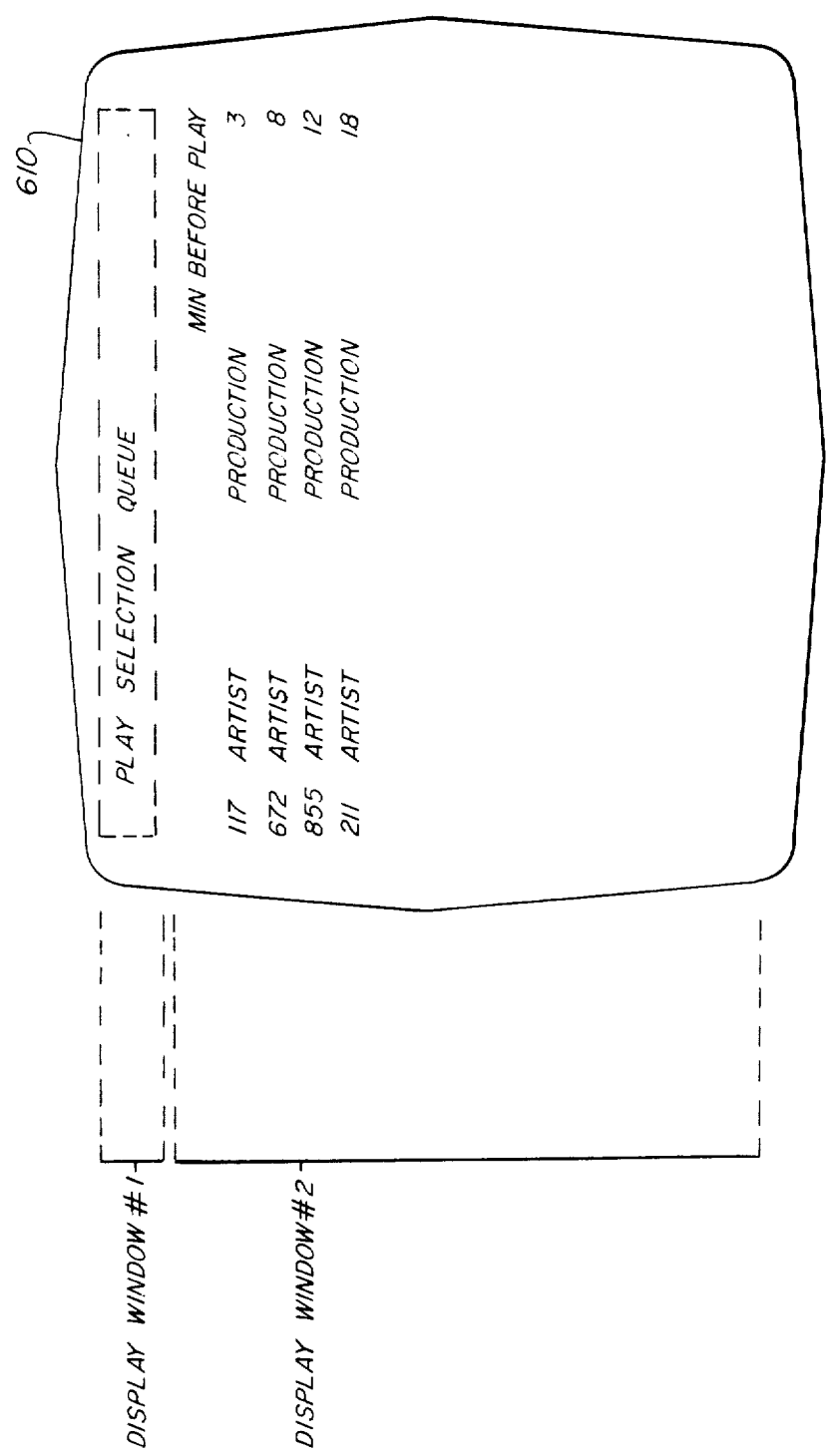
Figure 21:
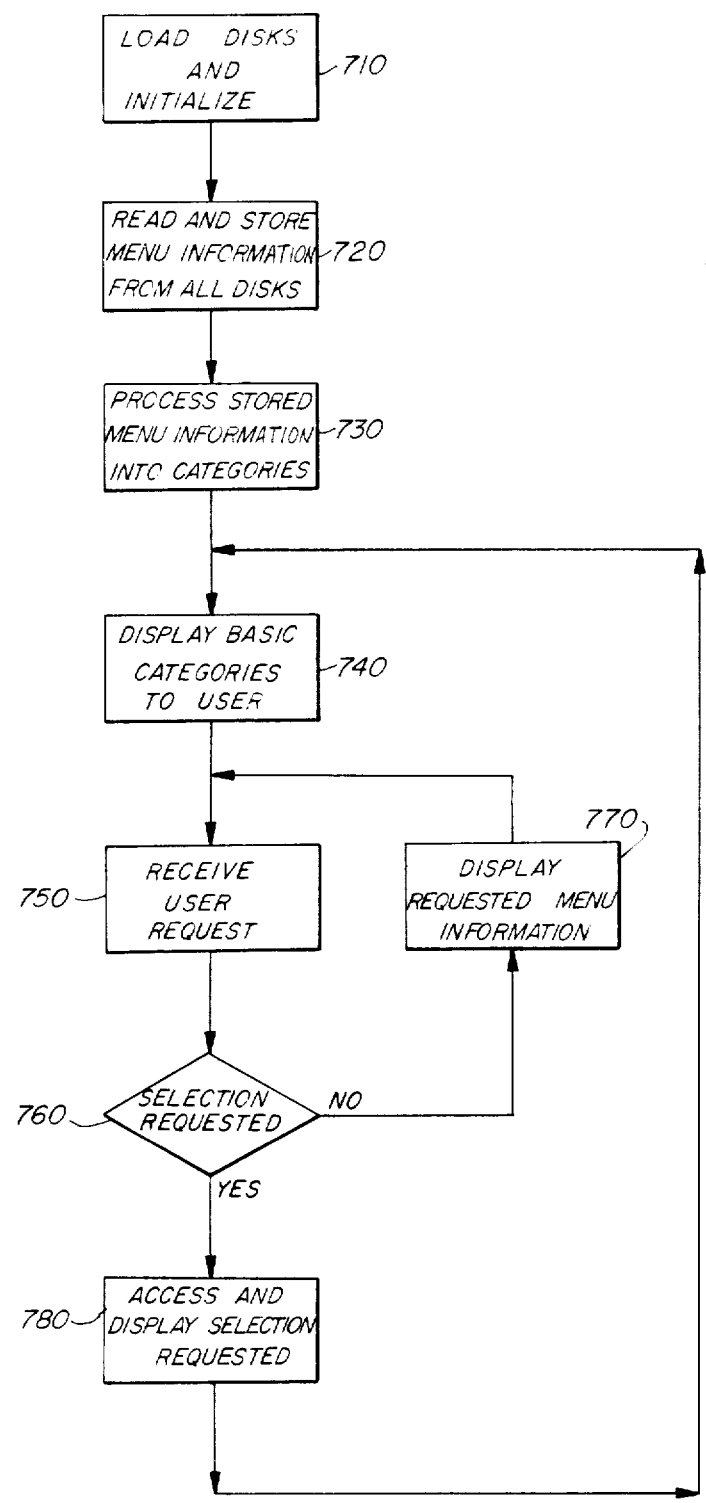
FIG. 21 is a flow chart of a method of providing a menu display and user selection according to the invention.

FIGS. 20A-20C illustrate menu displays resulting from pressing buttons 612, 614 and 616. In FIGS. 20A and 20B, the user has already selected the category of "Hard Rock", and then pressed buttons 612 and 616, respectively. In FIG. 20C, the user simply pressed button 614.

The display in FIG. 20A, on screen 610, includes three display windows. In the first, the title of the data displayed, "Hard Rock Selections by Artist" is shown, together with the selection numbers of the most popular selections in that category, which may be emphasized by reverse video display. In the second window, the selections in that category are listed alphabetically by artist, followed by the blinking word "End" to indicate the end of the category. When the user presses the scroll keys 618a, 618b, 620a, 620b, the contents of the second window will scroll accordingly. In FIG. 20A, only the name of the artist and the title of the selection or production are displayed with the selection number but additional data could be displayed, such as year of recording or release and production company. The third window displays, for example, the price per selection, the number of selection credits available to the user, and the number of a selection entered by keys 622, 624a, 624b.

FIG. 20B resembles FIG. 20A, but shows the display resulting from pushing button 616. As noted in the first window, selection number 173 in one of the top 3 hits. Therefore, it also appears in reverse video in the second window. The second window begins with the blinking word "Start" to indicate the beginning of the category.

FIG. 20C shows the display of the play selection queue on screen 610 in response to button 614. The title is in the first window and the selections are in the second window. In general, when a user enters a selection, his request will be added to the queue. The selection will be displayed on his terminal or on a separate selection display terminal when it reaches the top of the queue. If the queue is empty, pressing the enter button 624a, or 624 or otherwise entering a selection may, in effect, cause the menu terminal to switch to a selection display terminal, displaying the requested selection.

Additional displays similar to FIGS. 20A-20C could be provided, such as a display of some number of the most popular selections of a category or of a particular artist, a display of all the selections of an artist in all categories, and so forth. Also, a special push button labeled "Help" could be provided, so that the user could request instructions on the use of the system.

The menu viewing station 30c and menu terminals 530a-530n, like the selection viewing stations 30a, 30b, discussed above, may perform a number of functions for communicating with the central controller or central processor. In addition, each menu viewing station or menu terminal may perform routines which permit information to be received from the central controller 160 or central processor 510 and stored in the non-volatile memory 190a or in RAM 522a for updating. The information received may include a complete entry for the menu table, a complete entry for the category table, or a complete entry for the table of production company names.

Service console 40, shown in FIGS. 1 and 13, permits a service person to revise basic operation data stored in the central controller 160. Although service console 40 may take a number of forms, the embodiment shown in FIG. 1 is intended to represent a standard Radio Shack TRS-80 Model 100, NEC 8201A, or other similar portable computer. Such a portable computer typically has at least the following features: LCD alpha-numeric display 42; keyboard 44, including both typewriter keys and programmable function keys; RS-232 port; parallel printer interface; built-in modem; cassette interface; bar code reader interface; external power adaptor; and 32 kilobytes of internal random access memory.

Routines performed by the service console 40 in response to service personnel may be performed in relation to the central controller 160 when connected through the RS-232 port 24b, as shown in FIG. 1. After an appropriate routine to establish the identity of the service person, service console 40 may cause central controller 160 to provide information about the number of coin pulses per selection, the number of magazines 58 in the system, any specific selection in the selection table, the contents of the playing queue, the stimulation time out period, the contents of the category table, and the contents of the production company name table. When these items of information are retrieved, the service person may modify them, using the service console 40. In addition, the service console 40 may be used to command that a video disk menu be reloaded from one of the disks 52; that a video disk menu be reloaded from an entire magazine 58 of video disks; that the accounting data from the central controller 160 be provided to the service console 40 for each selection; that the number of times played for all selections be reset to 0; that a new video disk menu be loaded from a bar code reader or cassette (not shown) into the central controller 160; that a video disk menu be stored on the cassette; that central controller 160 suspend system operations and allow direct control of robotic arm control 170 from service console 40 by sending commands through central controller 160 to robotic arm control 170; and that central controller 160 reset all queues and restart the entire system. In addition, service console 40 may be used to obtain reports through the parallel printer interface for listing the accounting data or the most popular selections.

The above-described embodiment of the invention is especially suited to use as a video jukebox or replay system. The invention may, however, be embodied in many other forms, including the interactive video system described below.

IV. Interactive Video System

The present invention is useful in many environments in which a large amount of information is presented visually to a user. An embodiment in which a user may interactively access such information is illustrated in FIGS. 17 and 18.

Figure 17:
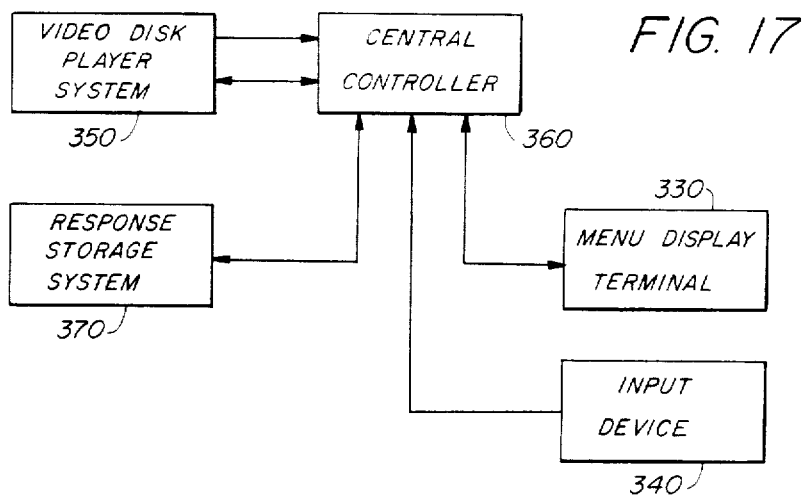
FIG. 17 is a schematic block diagram of an alternate embodiment of the invention which may be used as an interactive information system.

The interactive embodiment shown in FIG. 17, includes at least two kinds of memory storage units, such as floppy disks or any other memory in response storage system 370 and video disks in video disk player system 350. Each type of storage unit could have a corresponding servoarm or other stacker system, and the storage units would be loaded in pairs with one type of storage unit, such as the floppy disks, storing the user response after processing and perhaps controlling the operations of the central controller 360 or of a larger data processing system, and the other storage unit, such as the video disks, providing the appropriate display on menu/display terminal 330 in response to commands from the central controller 360. In this embodiment, the user could access a series of displays in an interactive manner using input device 340, such that the user's response to each display would select the subsequent display.

Figure 18:
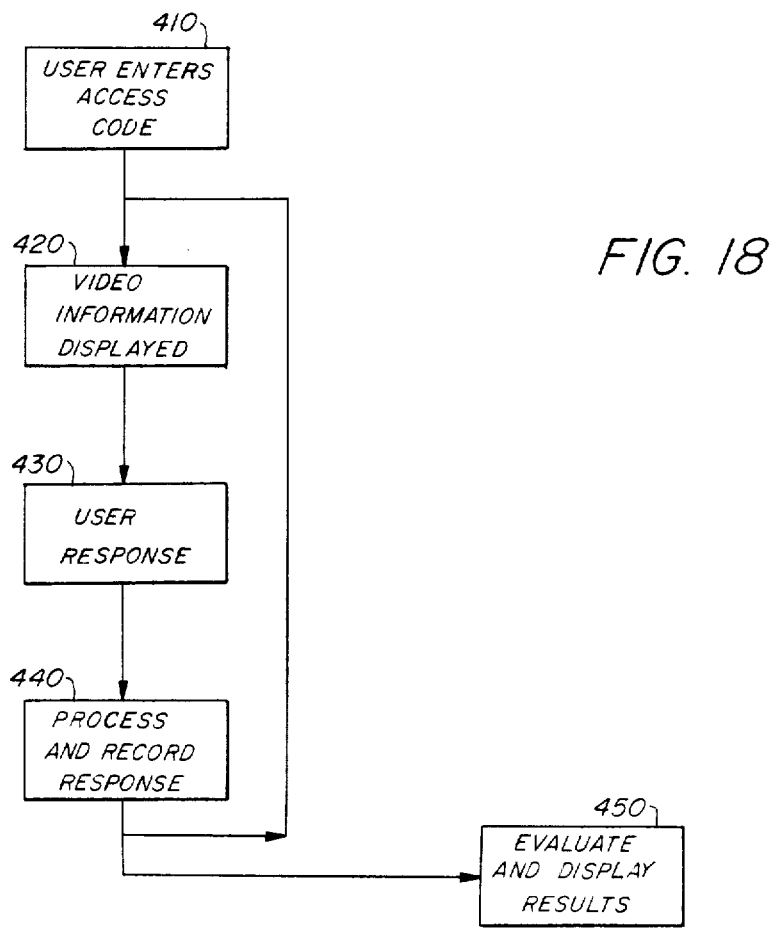
FIG. 18 is a flow chart of one method of operation of the embodiment of FIG. 17.

FIG. 18 shows the basic steps of a method of operation of such an interactive video system. The central controller 360 or other control means will first receive an access code entered by the user, as shown in box 410. If the access code is valid, controller 360 will cause a display of video information from video disk player system 350 on terminal 330, as shown in box 420. The display will continue until a user response from input device 340 is received, as shown in box 430. Controller 360 will then process the response and record it or some summary or other processed form of it in response storage system 370, as shown in box 440. Controller 360 may then continue with a display in response to the user response, repeating the steps in boxes 420–440. It may also evaluate and display the user response, as shown in box 450.

This interactive system could be used in many educational or entertainment situations to access visual data according to a user's response. The result could be a highly realistic simulation of a real-life situation, such as the operation of an automobile or airplane. More importantly, this embodiment would expand the data base and its interactive feature to permit access to a much greater quantity of information without manual involvement and could make the data base available as an organized library to many users.

V. Miscellaneous

The video replay system of the present invention has been described in detail, but many variations will suggest themselves to those of ordinary skill in the art. For example, it will be apparent that the present invention is not limited to audio/video information, but may be used for any information retrieval system in which information is stored on storage units and retrieved for presentation or editing purposes at remote terminals. Such a system may use any type of disk, including diskettes and phonograph records, and may use any appropriate reading device, either for storing or retrieving information. In addition, the user units needs not be limited to CRT displays, but may include any appropriate device for presenting information retrieved from the disks. In addition, the service console 49, rather than being a portable unit, may be built into the central unit 20 in such a manner that it is only accessible to service personnel.

As noted above, the invention may be used for educational or entertainment purposes. In particular, in addition to the embodiments disclosed above, the invention could be used in an educational embodiment in which a student could access any desired information within the system from one of the user stations. In this embodiment, the students could not typically be required to insert coins before use, but would have an allocation of time or an access code or access card, so that the control means would store the amount of time for each user or would store an indication of the time to be charged to the access code or card used.

Another embodiment of interest is a video game embodiment, in which a variety of video games are stored on disks or tapes and made available to users, each of whom accesses a game through a user station. The system could be arranged with a single user station and a large number of games available to a user at that station, or, a number of user stations could be provided, each associated with a corresponding player at the central control station. Each user station could be equipped with an appropriate input means, such as a universal joystick. In this embodiment, it may be appropriate to provide a plurality of servo-arms, with each servo-arm being used to provide the disks or tapes for a particular game. Each user would be able to access each game from his user station. A fractionalized or split screen could be provided for advertising more than one of the games available at once. For that purpose, a special disk could be used to store the split screen display including a screen portion advertising each game and indicating an access code for that game. The special disk could also store the initial part of each game advertised, so that selection of a game by a user would begin the game immediately. By the end of the initial part, the disk storing the remainer of the game would be retrieved, so that there would be no interruption from the time of user selection by pressing the access code through execution of the game.

Although the present invention has been described in connection with a number of preferred embodiments thereof, many other variations and modifications will now become apparent to those skilled in the art. It is preferred, therefore, that the present invention be limited, not by the specific disclosure herein, but only by the appended claims.

What is claimed is:

1. An information system comprising:

means for storing a plurality of storage units;

a plurality of operating means, each operable for retrieving information stored in a respective storage unit, the information in each of such storage units including at least one selection, at least one of the user units comprising selection input means for receiving inputs from a user requesting one of the selections and for providing a selection input signal to the control means indicating the selection requested;

a plurality of user units for presenting information to users, at least one of the user units being a menu display unit for displaying menu information to a user, the control means being further operable for providing menu information for display on the menu display unit;

the information in each of such storage units including stored menu information;

control means for selectively connecting at least one of the operating means to at least one of the user units for presenting information, retrieved from such respective storage unit by each selectively connected operating means, to a user;

the control means further operable for controlling the respective operating means to provide the selection requested to the user unit in response to the selection input signal;

the control means comprising accounting memory means for storing accounting data, the accounting data including a count of the selection input signals for each selection, the control means being further operable for incrementing the count for each selection whenever a selection input signal for that selection is received;

the control means being further operable for controlling each operating means to retrieve the stored menu information from all storage units of such plurality of storage units for integrating and updating the menu information provided to the menu display unit, prior to display of menu information by the menu display unit of stored menu information from such plurality of storage units;

the control means being further operable for controlling the respective operating means to provide the selection requested to the user unit in response to the selection input signal.

2. The system of claim 1 in which the control means further comprises a selection memory means for storing selection data about the selections in the storage units, the control means being further operable for formatting at least some of the selection data from the selection memory means to provide menu information.

3. The system of claim 1 in which the control means is further operable for formatting the selection data in accordance with the accounting data stored in the accounting memory means for providing menu information indicating the selection requested most often.

4. The system of claim 1 in which the menu display unit comprises menu input means for receiving inputs from a user indicating a type of menu information desired and for providing a menu input signal to the control means indicating the desired type of menu information, the control means being further operable for providing the desired type of menu information to the menu display unit in response to the menu input signal.

5. The system of claim 1 in which the control means further comprises a queue memory means for storing a plurality of selection request data units, each selection request data unit corresponding to a respective selection input signal, the control means being further operable for storing a selection request data unit in the queue memory means whenever a selection input signal is received until the selection requested has been provided.

6. The system of claim 1 in which the information in each storage unit is a single selection, at least one of the single selections being stored in a plurality of the storage units, the control means further comprising a selection queue memory means for storing a plurality of selection storage data units, each selection storage data unit indicating a respective one of the storage units storing the single selection, the control means further operable for controlling the operating means to retrieve the single selection from the storage unit indicated by a first selection storage data unit in the selection queue memory means when a selection input signal is received indicating that single selection.

7. The system of claim 1 in which the control means comprises an accounting memory means for storing accounting data, at least one of the user units comprising user input means for receiving inputs from a user and for providing user input signals to the control means indicating the user inputs, the control means being further operable for updating the accounting data in response to the user input signals.

8. The system of claim 7 in which each user has a user number, each user input signal indicating the user number of the user providing the inputs, the control means being operable for updating accounting data about the user in response to each user input signal.

9. The system of claim 7 in which each user input signal indicates the user unit providing that user input signal, the control means being operable for updating accounting data about the user unit in response to each user input signal.

10. The system of claim 1 in which at least one of the user units is a menu display unit for displaying menu information about the stored information in the storage units to a user, the control means being further operable for providing menu information for display on the menu display unit.

11. The system of claim 10 in which the information in each of the storage units includes stored menu information, the control means being further operable for controlling each operating means to retrieve the stored menu information from the respective storage unit for updating the menu information provided to the menu display unit.

12. The system of claim 10 in which the menu display unit comprises switching means for switching the menu display unit from displaying menu information to displaying information retrieved from one of the storage units.

13. An information system, comprising:
- a plurality of operating means, each operable for interacting with information stored on a respective storage unit, each operating means comprising loading means for loading the respective storage unit into, and unloading the respective storage unit from, that operating means, and each operating means being operable for retrieving information stored on a respective storage unit;
- a storage rack near the operating means for storing a plurality of such storage units;
- a plurality of user units for presenting the retrieved information and control means for selectively connecting the operating means to the user units for presenting the information retrieved by each operating means from such respective storage unit on at least one of the user units;
- carrying means for carrying such respective storage unit between the storage rack and the respective operating means and for inserting such storage unit into, and removing such storage unit from, the storage rack and the loading means of the operating means, the carrying means comprising support means movable relative to the storage rack for moving such storage unit between the storage rack and the respective operating means, and holding means on the support means for holding such storage unit while such storage unit is being carried;
- the information in each of such storage units including stored menu information,
- the control means being further operable for controlling each operating means to retrieve the stored menu information from each respective storage unit,
- at least one of the user units being a menu display unit for displaying menu information to a user, and
- the control means further comprising selection memory means for storing selection data relative to the selections in such storage units, the stored menu information from all storage units of such plurality of storage units being retrieved, for integrating and updating the menu information provided to the menu display unit from the selection memory means, prior to display by the menu display unit of stored menu information from such plurality of storage units.

14. The system of claim 13 in which each storage unit comprises an optically readable disk and each operating means further comprises a reader for optically reading information stored on the optically readable disks, the reader comprising a case with an opening defined therein, the loading means being arranged for loading and unloading each disk through the opening.

15. The system of claim 14 in which the disks are laser readable compact digital disks, the reader comprising means for retrieving the stored information by random access.

16. The system of claim 14 in which the loading means comprises a drawer slidably mounted in the opening in the case and transferring means for transferring each disk between the carrying means and the drawer.

17. The system of claim 13 in which each storage unit comprises a capacitively readable disk and each operating means further comprises a reader for capacitively reading information stored on the capacitively readable disks, the reader comprising a case with a slot defined therein, the loading means being arranged for loading and unloading each disk through the slot.

18. The system of claim 13 in which each storage unit is a disk and each operating means comprises a turntable for supporting a disk, the carrying means being further operable for positioning each disk over the turntable, the loading means being for loading each disk onto the turntable.

19. The system of claim 13 in which each storage unit is enclosed in a protective cover, the holding means comprising a claw for gripping the protective cover for holding the storage unit.

20. The system of claim 13 in which the control means is further operable for selectively controlling the movements of the carrying means.

21. The system of claim 20 in which the control means comprises a first microprocessor for providing selection signals indicating which storage unit is selected and a second microprocessor for receiving the selection signals and for providing actuating signals to the carrying means for moving the selected storage unit.

22. The system of claim 20, further comprising sensing means for providing a position signal indicating the position of the carrying means, the position signal being provided for the control means.

23. The system of claim 20 in which the storage rack and the carrying means are movable relative to each other for positioning the carrying means for inserting a storage unit into or removing a storage unit from a selected location in the storage rack, the control means being further operable for controlling the relative movements of the storage rack and the carrying means.

24. A method of displaying stored information to at least one user, comprising:
- selecting an operating unit from a plurality of operating units for retrieving stored information from a storage unit;
- selecting at least one user unit from a plurality of user units to display information to at least one user;
- connecting the selected operating unit to each selected user unit to provide the stored information from such storage unit to each selected user unit;
- displaying the stored information on each selected user unit;
- receiving an input from a user to one of the user units indicating a selection from the stored information to be displayed to the user from one of a plurality of storage units including such first-mentioned storage unit;
- retrieving menu information from each of the plurality of storage units, the menu information from each storage unit indicating the selections in that storage unit;

processing the menu information to provide a formatted menu; and displaying the formatted menu on a menu display unit to provide the menu information to a user.

25. The method of claim 24, further comprising the steps of:

storing the input from the user in a queue until the input reaches a head of the queue; and loading the storage unit having the selection indicated by the input into the selected operating units when the input indicating that selection reaches the head of the queue; the operating unit selecting step comprising selecting the operating unit as soon as a selection indicated by a previous input in the queue and retrieved by that operating unit has been completely displayed.

26. The method of claim 24 in which the user unit selecting step comprises selecting the user unit which received the input indicating the selection to be displayed.

27. The method of claim 24, further comprising the step of storing and updating a count of the number of inputs received indicating each selection; the processing step comprising ordering the menu information according to the stored and updated count for each selection.

28. The method of claim 24, further comprising receiving an input from a user to the menu display unit indicating a type of menu information to be provided in the formatted menu displaying step, the processing step comprising selecting the indicated type of menu information.

* * * * *